US008423559B2

(12) United States Patent
Matsushita et al.

(10) Patent No.: US 8,423,559 B2
(45) Date of Patent: *Apr. 16, 2013

(54) ALBUM GENERATING APPARATUS, ALBUM GENERATING METHOD AND PROGRAM

(75) Inventors: Masahiro Matsushita, Kanagawa (JP); Kenji Kojima, Tokyo (JP); Yasuhiko Kaneko, Kanagawa (JP); Kimiko Tachikawa, Tokyo (JM); Ayumu Isomura, Tokyo (JP); Shinsuke Zetsu, Tokyo (JP); Yasuyo Nenoki, Tokyo (JP); Hiroyuki Funakura, Kanagawa (JP); Hideaki Yoshihara, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 13/215,724

(22) Filed: Aug. 23, 2011

(65) Prior Publication Data

US 2012/0008873 A1 Jan. 12, 2012

Related U.S. Application Data

(63) Continuation of application No. 11/375,097, filed on Mar. 15, 2006.

(30) Foreign Application Priority Data

Mar. 15, 2005 (JP) .................. 2005-074090
Jan. 20, 2006 (JP) .................. 2006-013143

(51) Int. Cl.
G06F 7/00 (2006.01)
G06F 17/30 (2006.01)

(52) U.S. Cl.
USPC ........................... 707/752; 707/812; 345/656

(58) Field of Classification Search .................. 707/752, 707/753, 915, 812; 345/619, 625, 634, 656; 345/682; 382/151, 171, 173, 216, 291, 295; 715/233, 238

See application file for complete search history.

(56) References Cited

U.S. PATENT DOCUMENTS 5,579,471 A 11/1996 Barber et al.
5,600,768 A 2/1997 Andresen
(Continued)

FOREIGN PATENT DOCUMENTS

JP 10-126731 A 5/1998
JP 10-129721 A 5/1998
(Continued)

OTHER PUBLICATIONS

A. C. Loui et al., A software system for automatic albuming of consumer pictures, 1999, ACM, 159-162.*

(Continued)

*Primary Examiner* — Jean B Fleurantin
(74) *Attorney, Agent, or Firm* — Birch, Stewart, Kolach & Birch, LLP

(57) ABSTRACT

There is provided an album generating apparatus for generating an album whose pages are adequately allocated in accordance to image capturing position and time. The album generating apparatus has an image storing section for storing images by correlating with the image capturing time and position of the images, a importance judging section for judging importance of the image capturing time and image capturing position in the plurality of images stored in the image storing section, an image capturing time sorting section for sorting the plurality of images stored in the image storing section per page in the album based on the image capturing time stored in the image storing section when the importance judging section judges that the importance of the image capturing time is greater than that of the image capturing position, an image capturing position sorting section for sorting the plurality of images stored in the image storing section per page of the album based on the image capturing position stored in the image storing section when the importance judging section judges that the importance of the image capturing position is greater than that of the image capturing time and a layout determining section for laying out the images sorted per page by the image capturing time sorting section or the image capturing position sorting section to each page of the album.

15 Claims, 29 Drawing Sheets

U.S. PATENT DOCUMENTS

| | | | |
|---|---|---|---|
| 5,796,428 | A | 8/1998 | Matsumoto et al. |
| 6,123,362 | A | 9/2000 | Squilla et al. |
| 6,222,947 | B1 | 4/2001 | Koba |
| 6,567,983 | B1 | 5/2003 | Shiimori |
| 6,590,608 | B2 | 7/2003 | Matsumoto et al. |
| 6,606,411 | B1 | 8/2003 | Loui et al. |
| 6,636,648 | B2 | 10/2003 | Loui et al. |
| 6,748,097 | B1 | 6/2004 | Gindele et al. |
| 6,804,684 | B2 | 10/2004 | Stubler et al. |
| 6,850,247 | B1 | 2/2005 | Reid et al. |
| 6,996,782 | B2 | 2/2006 | Parker et al. |
| 7,148,990 | B2 | 12/2006 | Atkins et al. |
| 7,290,365 | B1 | 11/2007 | Plutsky |
| 7,324,135 | B2 | 1/2008 | Ouchi et al. |
| 7,369,164 | B2 | 5/2008 | Parulski et al. |
| 7,487,524 | B2 | 2/2009 | Miyamori |
| 7,519,200 | B2 | 4/2009 | Gokturk et al. |
| 7,602,527 | B2 | 10/2009 | Yoda et al. |
| 7,756,334 | B2 | 7/2010 | Kim et al. |
| 7,822,233 | B2 | 10/2010 | Nagaoka et al. |
| 8,023,817 | B2 * | 9/2011 | Kashiwa et al. ............. 396/325 |
| 2002/0059322 | A1 | 5/2002 | Miyazaki et al. |
| 2002/0103813 | A1 | 8/2002 | Frigon |
| 2002/0122067 | A1 | 9/2002 | Geigel et al. |
| 2002/0135621 | A1 | 9/2002 | Angiulo et al. |
| 2002/0167538 | A1 | 11/2002 | Bhetanabhotla |
| 2002/0168108 | A1 | 11/2002 | Loui et al. |
| 2003/0059112 | A1 | 3/2003 | Loui et al. |
| 2003/0072486 | A1 | 4/2003 | Loui et al. |
| 2003/0095720 | A1 | 5/2003 | Chiu et al. |
| 2003/0108241 | A1 | 6/2003 | Colmenarez et al. |
| 2003/0128877 | A1 | 7/2003 | Nicponski |
| 2003/0198390 | A1 | 10/2003 | Loui et al. |
| 2004/0004663 | A1 | 1/2004 | Kahn et al. |
| 2004/0032599 | A1 | 2/2004 | Atkins et al. |
| 2004/0120009 | A1 | 6/2004 | White et al. |
| 2004/0136460 | A1 | 7/2004 | Zhang et al. |
| 2004/0201752 | A1 | 10/2004 | Parulski et al. |
| 2004/0208365 | A1 | 10/2004 | Loui et al. |
| 2004/0208377 | A1 | 10/2004 | Loui et al. |
| 2005/0027712 | A1 | 2/2005 | Gargi et al. |
| 2005/0044485 | A1 | 2/2005 | Mondry et al. |
| 2005/0081147 | A1 | 4/2005 | Tanaka et al. |
| 2005/0081237 | A1 | 4/2005 | Chen et al. |
| 2005/0111737 | A1 | 5/2005 | Das et al. |
| 2005/0210414 | A1 | 9/2005 | Angiulo et al. |
| 2005/0278371 | A1 | 12/2005 | Funk et al. |
| 2006/0056737 | A1 | 3/2006 | Ohtsuka et al. |
| 2006/0078201 | A1 | 4/2006 | Kim et al. |
| 2006/0092771 | A1 | 5/2006 | Loui et al. |
| 2006/0104542 | A1 | 5/2006 | Blake et al. |
| 2006/0120618 | A1 | 6/2006 | Mizoguchi |
| 2006/0155761 | A1 | 7/2006 | Van De Sluis et al. |
| 2006/0181546 | A1 | 8/2006 | Jung et al. |
| 2006/0200758 | A1 | 9/2006 | Atkins |
| 2006/0204135 | A1 | 9/2006 | Funakura |
| 2006/0204143 | A1 | 9/2006 | Shiota et al. |
| 2006/0210165 | A1 | 9/2006 | Takemoto et al. |
| 2006/0210166 | A1 | 9/2006 | Takemoto et al. |
| 2006/0220983 | A1 | 10/2006 | Isomura et al. |
| 2007/0008321 | A1 | 1/2007 | Gallagher et al. |
| 2007/0101247 | A1 | 5/2007 | Matsuki et al. |
| 2008/0089590 | A1 | 4/2008 | Isomura et al. |
| 2008/0089592 | A1 | 4/2008 | Isomura |
| 2008/0107331 | A1 | 5/2008 | Kojima et al. |

FOREIGN PATENT DOCUMENTS

| | | |
|---|---|---|
| JP | 10-293856 A | 11/1998 |
| JP | 2001-228528 | 8/2001 |
| JP | 2003-259285 A | 9/2003 |
| JP | 2005-190401 A | 7/2005 |

OTHER PUBLICATIONS

A. Pentland, R. W. Picard and S. Sclaroff, "Photobook: Content-based manipulation of image databases," International Journal of Computer Vision 18(3), pp. 233-254 (1996).

Adrian Graham, Hector Garcia-Molina, Andreas Paepcke, Terry Winograd, "Time as essence for photo browsing through personal digital libraries," proceedings of the 2nd ACM/IEEE-CS joint conference on Digital libraries, pp. 326-335, Jul. 14-18, 2002, Portland, Oregon, USA.

Alexander C. Loui, Mark D. Wood, "A software system for automatic albuming of consumer pictures," Proceedings of the seventh ACM international conference on Multimedia (Part 2), p. 159-162, Oct. 30-Nov. 5, 1999, Orlando, Florida, United States.

C. Faloutsos, M. Flickner, W. Niblack, D. Petkovic, W. Equitz and R. Barber, "Efficient and Effective Querying by Image Content," Journal of Intelligent Information Systems, 3, pp. 231-262 (1994).

Geigel J. and Loui A., "Automatic Page layout Using Genetic Algorithms for Electronic Albuming," Proceedings of Electronic Imaging 2001 (Jan. 2001) available on-line at http://www.jogle.com/Research/publications/spieFinal.pdf.

Halas, Rose, "How to Organize a Family Photo Album", http://www.essortment.com/lifestyle/organizefamily_sykb.htm, 2002, pp. 1-3.

Hanchuan Peng et al., "Document image matching based on component blocks," Sep. 10-13, 2000, IEEE, 601-604.

John C. Platt, "AutoAlbum: Clustering Digital Photographs using Probablistic Model Merging," Proceedings of the IEEE Workshop on Content-based Access of Image and Video Libraries (CBAIVL'00), p. 96 et seq., Jun. 16-16, 2000.

Loui, A. and Savakis, A. "Automatic Image Event Segmentation and Quality Screening for Albuming Applications." 2000 IEEE, pp. 1125-1128.

Platt, J.C., Czerwinski, M., and Field, B.A., "Photo TOC: Automatic clustering for browsing personal photographs." Technical Report MSR-TR-2002-17, Microsoft Research, 2002.

S. Yang, K.S. Seo, Y.M.Ro, S.K. Kim, and J. Kim and Y. Seo, "User-centric digital home photo album", Proc. IEEE Int. Conf. Consum Electron., pp. 226-229, 2005.

Viegas, F. B., "Collections: Adapting the Display of Personal Objects for Different Audiences," Master of Science Thesis, Massachusetts Institute of Technology, Feb. 2000.

Yong Rui, Thomas S. Huang, Sharad Mehrotra, "Exploring Video Structure Beyond the Shots," Proceedings of the IEEE International Conference on Multimedia Computing and Systems, p. 237 et seq., Jun. 28-Jul. 1, 1998.

* cited by examiner

```
Name        : Nana
File        : DSC0011.jpg
Position    : Left
Casting     : Hero
Date of Birth : 2001.11.15
```
~1802

```
Name        : ──
File        : DSC0011.jpg
Position    : Right
Casting     : Brother
Date of Birth : ──
```
~1804

```
Name        : ──
File        : DSC0021.jpg
Position    : Center
Casting     : Friend
Date of Birth : ──
```
~1806

*FIG. 18*

| SPREAD PAGE | COMPOSITE INFORMATION |
|---|---|
| #1 | MAIN SUBJECT |
| #2 | TIME |
| #3 | TIME |
| #4 | TIME |
| #5 | MAIN SUBJECT |
| ⋮ | ⋮ |

*FIG. 21*

| COLOR RANGE | EXPECTED VALUE OF AREA RATIO | AREA RATIO | |
|---|---|---|---|
| COLOR RANGE A | 8% | 10% | |
| COLOR RANGE B | 10% | 15% | |
| COLOR RANGE C | 3% | 12% | ⟹ CHARACTERISTIC COLOR |
| ⋮ | ⋮ | ⋮ | |

*FIG. 22*

| POSTALIZATION IMAGE ID | PATTERN INFORMATION | COLOR INFORMATION |
|---|---|---|
| #2801 | PATTERN A | COLOR DISTRIBUTION A |
| #2802 | PATTERN B | COLOR DISTRIBUTION B |
| ⋮ | ⋮ | ⋮ |

ALBUM GENERATING APPARATUS, ALBUM GENERATING METHOD AND PROGRAM

CROSS REFERENCE TO RELATED APPLICATION

The present application is a Continuation of co-pending application Ser. No. 11/375,097 filed on Mar. 15, 2006, which claims priority from Japanese Patent Applications Nos. JP 2005-074090 filed on Mar. 15, 2005 and JP 2006-13143 filed on Jan. 20, 2006, the entire contents of all of the aforementioned applications being incorporated herein by reference.

BACKGROUND OF THE INVENTION

1. Field of the Invention

The present invention relates to an album generating apparatus, an album generating method and a program. More specifically, the invention relates to an album generating apparatus and an album generating method for generating an album and to a program for the album generating apparatus.

2. Related Art

There has been known an album generating system for generating an album laid out so as to dispose a map of traveling spots at a center of a screen and so that a user can see a relationship between the map and images disposed around the map by connecting the images and image capturing positions on the map by lines based on tag information such as information on position, image capturing time and others tagged to data of images captured at the traveling spots as disclosed in Japanese Patent Laid-Open No. 1998-126731 for example.

However, it has been unable to generate an adequate album for recording a child's growth for example by the technology of JP Laid-Open No. 1998-126721. In case of such album of recording a child's growth, it is desirable to be able to allocate pages in order of image capturing dates for example so that an appreciator can actually feel the child's growth every time when the appreciator turns the pages.

Still more, in case of an album composed of images captured while traveling across the Europe, it is desirable to be able to allocate the images to pages based on places where the images were captured by allocating the images per every country for example.

However, there has been a problem that it takes time for the generator of the album to generate such album because it is required to judge the allocation of images desirable for the cameraman based on the contents of the images.

SUMMARY OF THE INVENTION

Accordingly, it is an object of the invention to provide an album apparatus, an album generating method and a program that are capable of solving the above-mentioned problems. This object may be achieved through the combination of features described in independent claims of the invention. Dependent claims thereof specify preferable embodiments of the invention.

According to a first aspect of the invention, an album generating apparatus has an image storing section for storing images by correlating with image capturing time and image capturing position of the images, a importance judging section for judging importance of the image capturing time and image capturing position in the plurality of images stored in the image storing section, an image capturing time sorting section for sorting the plurality of images stored in the image storing section per page in the album based on the image capturing time stored in the image storing section when the importance judging section judges that the importance of the image capturing time is greater than that of the image capturing position, an image capturing position sorting section for sorting the plurality of images stored in the image storing section per page of the album based on the image capturing position stored in the image storing section when the importance judging section judges that the importance of the image capturing position is greater than that of the image capturing time and a layout determining section for laying out the images sorted per page by the image capturing time sorting section or the image capturing position sorting section to each page of the album.

The album generating apparatus may further include a distribution-of-image capturing position calculating section for calculating a distribution of image capturing positions of the plurality of images stored in the image storing section based on the image capturing position of the plurality of images stored in the image storing section and the importance judging section may judge that importance of the image capturing position is greater than the image capturing time when deviation of the distribution of image capturing positions calculated by said distribution- of-image capturing position calculating section is larger than a reference value set in advance.

The album generating apparatus may further include a distribution-of-image capturing time calculating section for calculating a distribution of image capturing times of the plurality of images stored in the image storing section based on the image capturing time of the plurality of images stored in the image storing section and the image capturing time sorting section may sort the plurality of images stored in the image storing section so that a number of images sorted into each page of the album is almost equalized based on the distribution of image capturing times calculated by the distribution-of-image capturing time calculating section.

The image capturing position sorting section may sort the plurality of images stored in the image storing section so that a number of images sorted into each page of the album is almost equalized based on the distribution of image capturing positions calculated by the distribution-of-image capturing position calculating section.

The album generating apparatus may further include a main image selecting section for selecting a main image that is to be a primary image in a predetermined page of the album out of the images sorted into the predetermined page by the image capturing time sorting section or image capturing position sorting section and a subsidiary image selecting section for selecting a subsidiary image that is to bean image subsidiary to the main image selected by the main image selecting section in the predetermined page in the album out of the images sorted into the predetermined page by the image capturing time sorting section or the image capturing position sorting section based on contents of the main image selected by the main image selecting section, and the layout determining section may lay out the main image selected by the main image selecting section and the subsidiary image selected by the subsidiary image selecting section into the predetermined page of the album based on the contents of the main image selected by the main image selecting section and the subsidiary image selected by the subsidiary image selecting section.

According to a second aspect of the invention, an album generating method has an image storing step of storing images by correlating with image capturing time and image capturing position of the images, a importance judging step of judging importance of the image capturing time and image capturing position in the plurality of images stored in the image storing step, an image capturing time sorting step of sorting the plurality of images stored in the image storing step per page in the album based on the image capturing time stored in the image storing step when it is judged in the importance judging step that the importance of the image capturing time is greater than that of the image capturing position, an image capturing position sorting step of sorting the plurality of images stored in the image storing step per page of the album based on the image capturing position stored in the image storing step when it is judged in the importance judging step that the importance of the image capturing position is greater than that of the image capturing time and a layout determining step of laying out the images sorted per page in the image capturing time sorting step or the image capturing position sorting step to each page of the album.

According to a third aspect of the invention, a program for an album generating apparatus for generating an album operates the album generating apparatus so as to function as an image storing section for storing images by correlating with image capturing time and image capturing position of the images, a importance judging section for judging importance of the image capturing time and image capturing position in the plurality of images stored in the image storing section, an image capturing time sorting section for sorting the plurality of images stored in the image storing section per page in the album based on the image capturing time stored in the image storing section when the importance judging section judges that the importance of the image capturing time is greater than that of the image capturing position, an image capturing position sorting section for sorting the plurality of images stored in the image storing section per page of the album based on the image capturing position stored in the image storing section when the importance judging section judges that the importance of the image capturing position is greater than that of the image capturing time and a layout determining section for laying out the images sorted per page by the image capturing time sorting section or the image capturing position sorting section to each page of the album.

It is noted that the summary of the invention described above does not necessarily describe all necessary features of the invention. The invention may also be a sub-combination of the features described above.

EFFECT OF THE INVENTION

Thus, the invention can provide the appreciator with the album whose pages are allocated adequately in accordance to image capturing times or image capturing positions.

BRIEF DESCRIPTION OF THE DRAWINGS

FIG. 18 shows one exemplary contents of specific subject information.

FIG. 21 is a table showing one exemplary composite information of images.

FIG. 22 is a table showing one exemplary method of a characteristic color sampling section in sampling a characteristic color.

FIG. 28 is a table showing one exemplary characteristic value of the postalization image.

DETAILED DESCRIPTION OF THE INVENTION

The invention will now be described based on preferred embodiments, which do not intend to limit the scope of the invention, but exemplify the invention. All of the features and the combinations thereof described in the embodiments are not necessarily essential to the invention.

Figure 1:
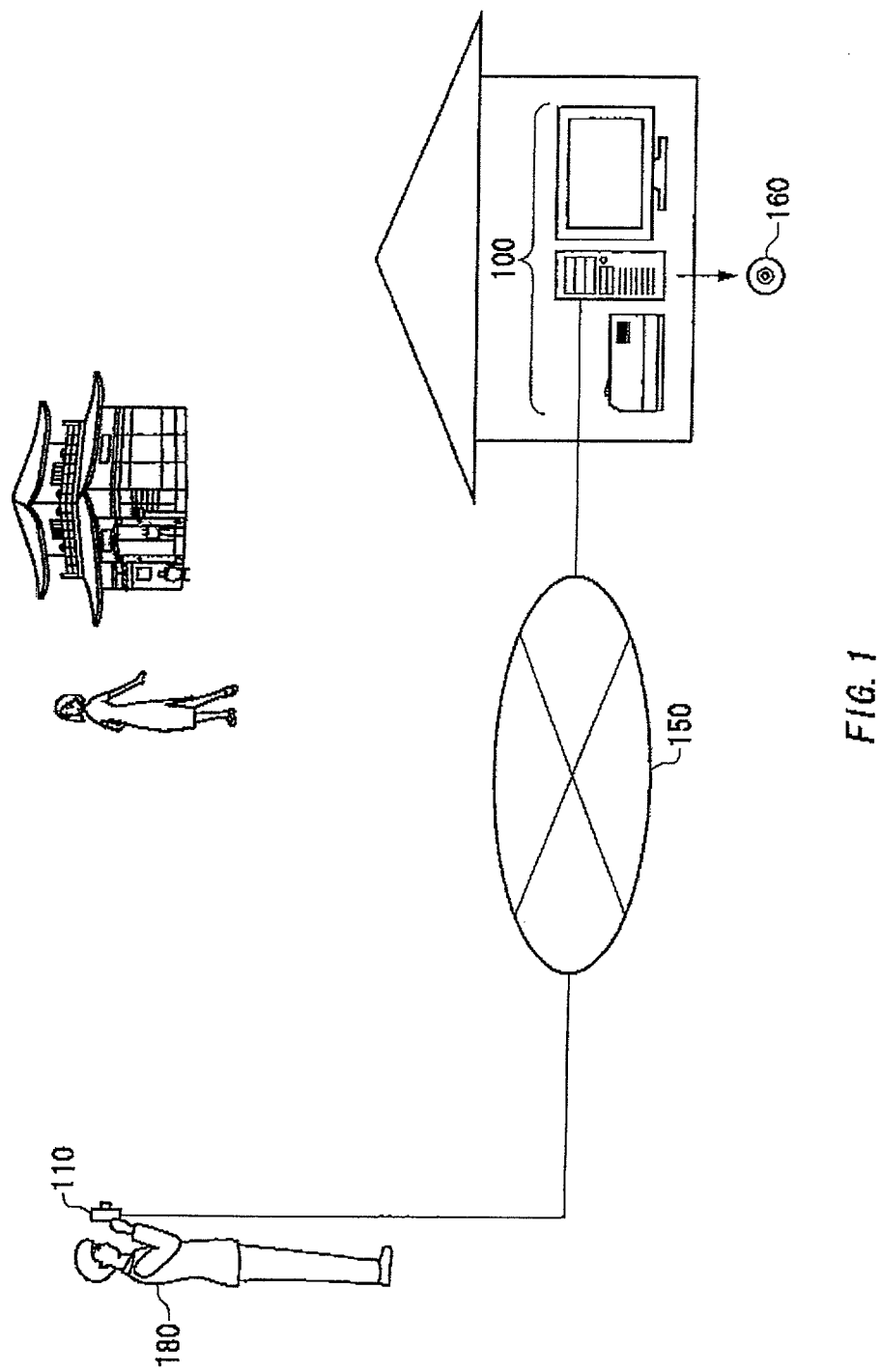
FIG. 1 is a drawing showing one exemplary environment for using an album generating apparatus.

FIG. 1 shows one exemplary environment for using an album generating apparatus 100 according to one embodiment of the invention. When a user 180 presses a release button to capture an image, an image capturing device 110 records image capturing time and image capturing position on the captured image by tagging as tag information. The album generating apparatus 100 receives the image from the image capturing device 110 via a recording medium such as a semiconductor memory and a communication line 150 such as Internet and radio LAN. The album generating apparatus 100 selects and lays out images out of the received images to output as an album through a printer or on a display.

The album generating apparatus 100 allocates the images to each page of the album so that the images captured at times close to each other or captured at positions close to each other are stored in each page of the album. When a distribution of image capturing positions where the image were captured is geographically deviated at this time, the album generating apparatus 100 allocates the images so that the images whose image capturing positions are close to each other are stored in each page. When the distribution is not geographically deviated, the album generating apparatus 100 allocates the images so that the images whose image capturing times are close to each other are stored in each page.

Then, the album generating apparatus 100 selects an image capturing a subject that frequently appears in the plurality of images allocated to each page as a main image representing each page. Or, the album generating apparatus 100 selects an image in which a subject is more motional in the plurality of images allocated to each page as a main image. Then, the album generating apparatus 100 selects an image capturing a subject related to the subject in the main image, such as a friend of the person in the main image of each page, as a subsidiary image to be disposed around the main image. Or, the album generating apparatus 100 selects an image capturing a subject other than the person captured in the main image of each page as a subsidiary image. Then, the album generating apparatus 100 outputs the album by laying out such that the main image is enlarged and disposed at the center rather than the subsidiary image in each page of the album.

It is noted that the album generating apparatus 100 may be an apparatus for generating and printing the album containing a plurality of images or may be an apparatus for displaying the plurality of images simultaneously on a screen. For example, the album generating apparatus 100 may be a personal computer, an electronic album, HDTV or a printer.

It is noted that the album generating apparatus 100 may receive the images captured by the image capturing device 110 by means of media such as a semiconductor memory in which such images are recorded. The album generating apparatus 100 may also record the images allocated to each page of the album in a recording medium 160 such as a CD-ROM per page. At this time, the album generating apparatus 100 may record the images together with layout information of each image in each page to a recording medium 160. The data recorded in the recording medium 160 by the album generating apparatus 100 is used in ordering or printing the album or in appreciating through the electronic album. It is noted that the album generating apparatus 100 may be a kiosk terminal installed in photo-shops, train stations and the like.

The album generating apparatus 100 described above can generate the album from which the appreciator would feel no sense of incompatibility because it allocates the images whose image capturing positions or image capturing times are close to each other to the same page. The album generating apparatus 100 also lays out an image that contains a person who appears in many more images or a person who is in larger action as a subject for example as a main image, so that it can generate the album in which a characteristic image is more highlighted.

Still more, the images may be combined adequately in each page because the images containing the persons deeply related with the person in the main image are automatically selected in each page. Therefore, the user 180 can have the album without taking time.

Figure 2:
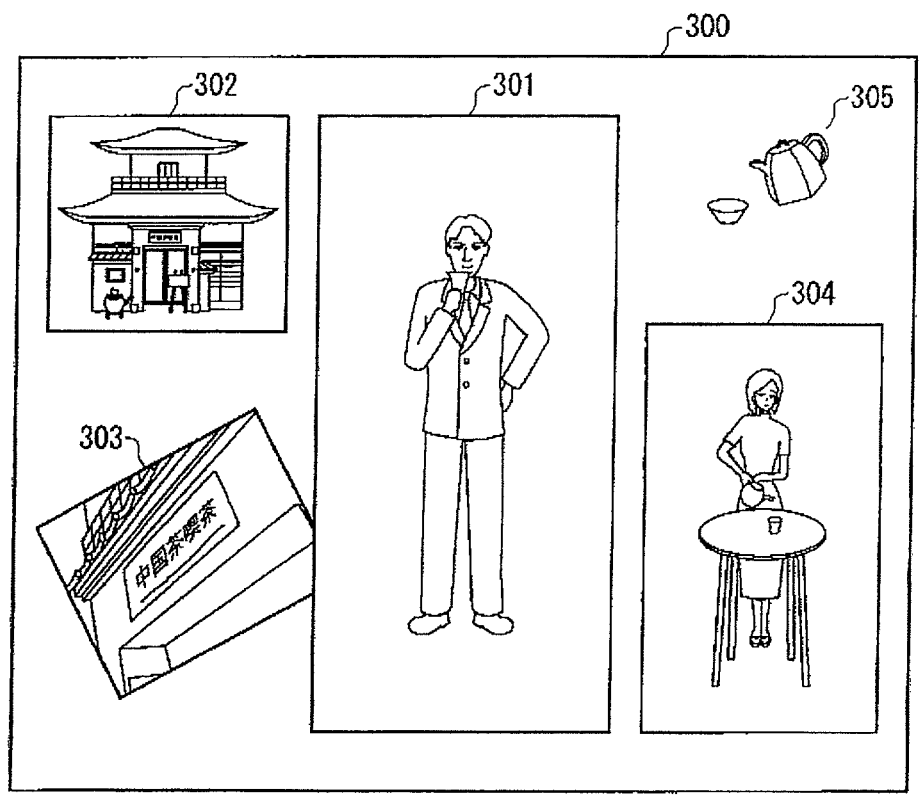
FIG. 2 is a drawing showing one exemplary layout result of a page of an album.

FIG. 2 shows one exemplary layout result 300 in a page of the album. The main image referred to in this embodiment means an image that is intended to impress the appreciator most in the page. For example, the main image may be a most highlighted image among a plurality of images disposed in a page. Specifically, the main image may be an image whose size is bigger than the other images, an image disposed to the front side as compared to the other images or an image disposed more to the center. Beside that, the main image may be an image highlighted by a frame around thereof or an image in which a visual effect has been applied to a subject. Still more, the subsidiary image of the embodiment may be an image smaller than the main image or an image disposed off the center. The example shown in FIG. 2 shows a case when an image 301 is a main image and images 302, 303 and 304 are subsidiary images. It is noted that the album generating apparatus 100 may lay out the images by trimming a specific subject out of the image. An image 305 is one exemplary image laid out after trimming a specific subject.

Preferably, each page has each own theme. The theme may be contents appealing to the appreciator such as scenes of a specific place like beauty of a park, moves of emotion of a specific person in a certain place or states of a specific object such as loveliness of a dog. In any case, the theme of the page is determined by the main image. When the main image is once determined, the subsidiary images having the same theme may be selected.

It is noted that the album generating apparatus 100 may have a plurality of templates defining image frames into which images are fitted within a page and may generate the album by fitting the images into such image frames defined by the templates . In this case, an image frame for a main image into which the main image is fitted may be determined in advance in such template. Still more, the album generating apparatus 100 may judge importance of the image frame into which the main image is to be fitted based on position, size and depth of the image frame and may fit the main image into the image frame whose weight is high. Specifically, the album generating apparatus 100 may set the position, size and depth of the image frame as variables, may weight each variable corresponding to a degree of impression given to the appreciator and may judge the importance of the image frame based on the variable. It is noted that the album generating apparatus 100 may have templates defining image frames having a shape of image, inclination of image and the like as parameters, e.g., an image frame into which the image 303 is fitted in the figure.

It is noted that the page referred to in this embodiment may be a spread page of the album or may be one page of the spread of the album. Still more, when the album generating apparatus 100 is an apparatus that outputs images as an album on a displaying device such as a display unit, the page may be a display area in which a plurality of images is displayed on the displaying device in the same time.

Figure 3:
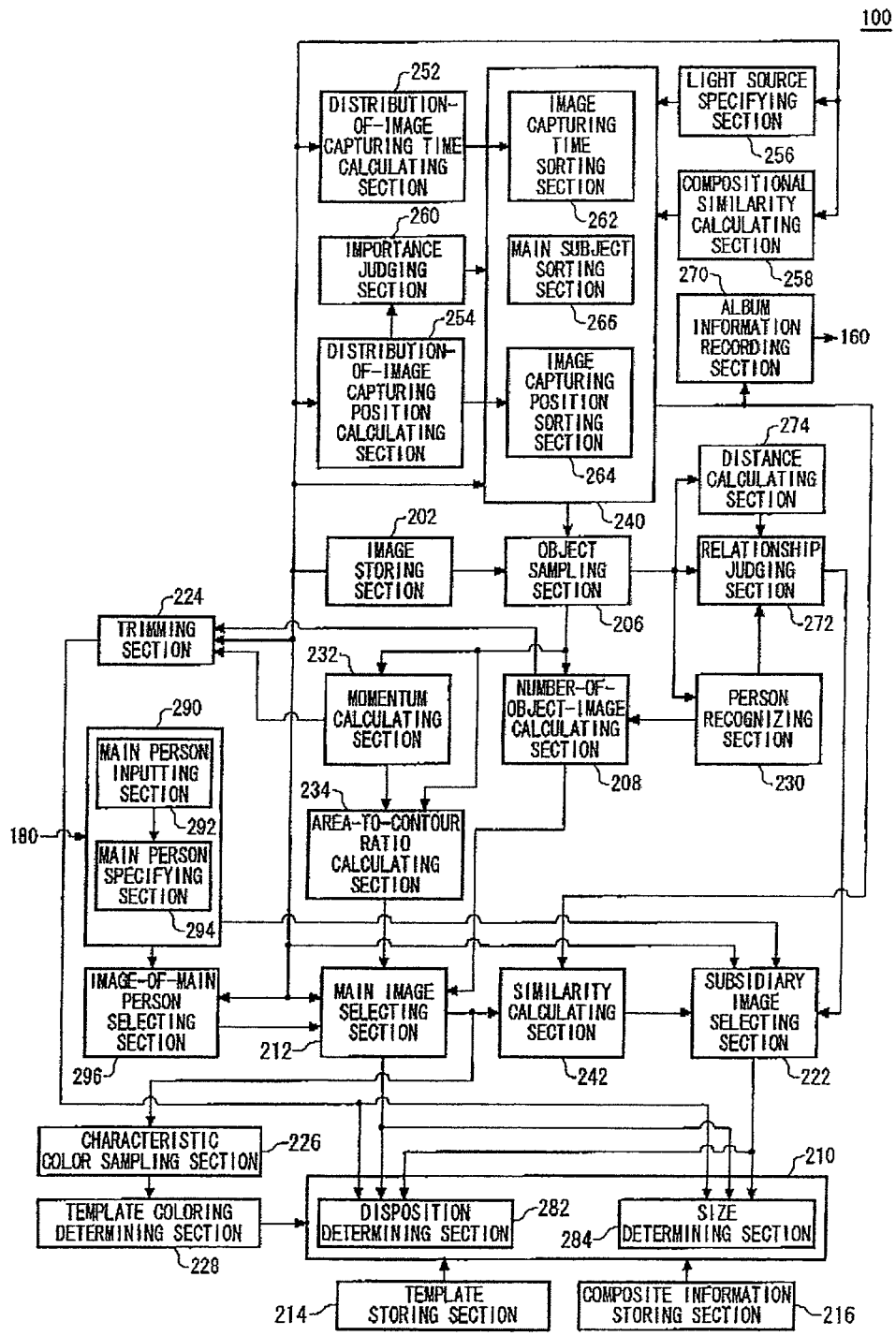
FIG. 3 is a block diagram showing one exemplary block configuration of the album generating apparatus.

FIG. 3 is a block diagram showing one exemplary block configuration of the album generating apparatus 100. The album generating apparatus 100 has an image storing section 202, an object sampling section 206, a number-of-object-image calculating section 208, a layout determining section 210, a main image selecting section 212, a subsidiary image selecting section 222, a trimming section 224, a person recognizing section 230, a momentum calculating section 232, an area-to-contour ratio calculating section 234, the image sorting section 240, a similarity calculating section 242, an distribution-of-image capturing time calculating section 252, an distribution-of-image capturing position calculating section 254, a importance judging section 260, a relationship judging section 272, a distance calculating section 274, a specific subject information getting section 290, an image-of-main person selecting section 296, a characteristic color sampling section 226, a template coloring determining section 228, a template storing section 214, a composite information storing section 216, a light source specifying section 256, a compositional similarity calculating section 258 and an album information recording section 270. The image sorting section 240 has an image capturing time sorting section 262, an image capturing position sorting section 264 and a main subject sorting section 266. The layout determining section 210 has a disposition determining section 282 and a size determining section 284. The specific subject information getting section 290 has a main person inputting section 292 and a main person specifying section 294.

The image storing section 202 stores a plurality of images. The image storing section 202 also stores the images by correlating with their image capturing time and image capturing position. Specifically, the image storing section 202 records the image capturing time and image capturing position as tag information of the image at the time when the image capturing device 110 captured the image. Then, the album generating apparatus 100 stores the image in which the image capturing time and image capturing position are recorded by receiving from the image capturing device 110. It is noted that a final image is one example of the image.

The distribution-of-image capturing position calculating section 254 calculates a distribution of image capturing positions of the plurality of images stored in the image storing section 202 based on the image capturing positions of the plurality of images stored in the image storing section 202. The distribution-of-image capturing time calculating section 252 also calculates a distribution of image capturing times of the plurality of images stored in the image storing section 202 based on the image capturing times of the plurality of images stored in the image storing section 202.

The image sorting section 240 sorts the plurality of images stored in the image storing section 202 per event based on environment in which the image was captured. The event may be image capturing time or image capturing position for example. Specifically, the image sorting section 240 sorts the plurality of images stored in the image storing section 202 per page in the album in accordance to the image capturing times of the images. Still more, the image sorting section 240 sorts the plurality of images stored in the image storing section 202 per page in the album in accordance to the image capturing positions of the images.

Specifically, the image sorting section 240 sorts the plurality of images stored in the image storing section 202 per page in the album based on the distribution of image capturing positions calculated by the distribution-of-image capturing position calculating section 254. The image sorting section 240 also sorts the plurality of images stored in the image storing section 202 per page in the album based on the distribution of image capturing times calculated by the distribution-of-image capturing time calculating section 252.

At this time, the image sorting section 240 sorts the plurality of images stored in the image storing section 202 so that a number of images sorted into each page of the album becomes almost equal based on the distribution of image capturing times calculated by the distribution-of-image capturing time calculating sect ion 252. The image sorting section 240 also sorts the plurality of images stored in the image storing section 202 so that a number of images sorted into each page of the album becomes almost equal based on the distribution of image capturing positions calculated by the distribution-of-image capturing position calculating section 254. Then, the layout determining section 210 lays out the images sorted by the image sorting section 240 per page to each page of the album.

The main image selecting section 212 selects a main image that is to be the primary image in the album out of the plurality of images stored in the image storing section 202. Then, based on the contents of the main image selected by the main image selecting section 212, the subsidiary image selecting section 222 selects subsidiary images which become images subsidiary to the main image selected by the main image selecting section 212 in the album out of the plurality of images stored in the image storing section 202. Specifically, the main image selecting section 212 selects each main image per event sorted by the image sorting section 240. Then, the subsidiary image selecting section 222 selects each subsidiary image per event sorted by the image sorting section 240.

More specifically, the main image selecting section 212 selects the main image that is to be the primary image in a predetermined page in the album out of the images sorted by the image sorting section 240 to the predetermined page. Then, based on the contents of the main image selected by the main image selecting section 212, the subsidiary image selecting section 222 selects the subsidiary images to be subsidiary to the main image selected by the main image selecting section 212 in the predetermined page of the album out of the images sorted by the image sorting section 240 to the predetermined page. Specifically, based on the contents of the main image selected by the main image selecting section 212 and of the subsidiary images selected by the subsidiary image selecting section 222, the layout determining section 210 lays out the main image selected by the main image selecting section 212 and the subsidiary images selected by the subsidiary image selecting section 222 to the predetermined page in the album.

More specifically, based on the contents of the main image selected by the main image selecting section 212 and of the subsidiary images selected by the subsidiary image selecting section 222, the layout determining section 210 determines the layout of the main image selected by the main image selecting section 212 and the subsidiary images selected by the subsidiary image selecting section 222 in the album. Specifically, the disposition determining section 282 determines disposition of the main image selected by the main image selecting section 212 and the subsidiary images selected by the subsidiary image selecting section 222 in the album. The size determining section 284 determines the size of the main image selected by the main image selecting section 212 and of the subsidiary images selected by the subsidiary image selecting section 222 in the album. More specifically, the size determining section 284 determines the size of the main image selected by the main image selecting section 212 to be larger than that of the subsidiary images selected by the subsidiary image selecting section 222.

The similarity calculating section 242 calculates similarity of the main image selected by the main image selecting section 212 with each of the other images sorted into the same event with the main image selected by the main image selecting section 212. Then, the subsidiary image selecting section 222 selects the images whose similarity with the main image selected by the main image selecting section 212 is small as the subsidiary images per event sorted by the image sorting section 240. The similarity may be those determined by such indices as a focal distance, image capturing time, image capturing position or a hue of images when captured.

Therefore, it becomes possible to prevent the images stored in the same page from becoming only images captured in the same image capturing place or only images capturing a distant place for example.

Beside that, the subsidiary image selecting section 222 selects images containing subjects different from the subject of the main image selected by the main image selecting section 212 as the subsidiary images. For example, when a subject of the main image is sea, the subsidiary image selecting section 222 selects images containing persons as subsidiary images. Therefore, it is possible to prevent the contents of the main image and the subsidiary images from overlapping from each other. Still more, the subsidiary image selecting section 222 selects images containing persons other than the person who is the subject of the main image selected by the main image selecting section 212 as subsidiary images. Therefore, it is possible to prevent the images in the same page from becoming those containing only the same person. Still more, when there are more images belonging to the event sorted by the image sorting section 240, the subsidiary image selecting section 222 selects more subsidiary images. Therefore, the more the cameraman captures images with much interest, the more subsidiary images the subsidiary image selecting section 222 lays out, so that it becomes possible to provide a desirable album for the cameraman.

The importance judging section 260 judges the importance of the image capturing time and image capturing position in the plurality of images stored in the image storing section 202. Specifically, the importance judging section 260 judges that the image capturing position is more important than the image capturing time when deviation of the distribution of image capturing positions calculated by the distribution-of-image capturing position calculating section 254 is larger than a reference value set in advance. When a traveling record captured while traveling a tourist spot is compared with a record of child's growth captured in a home for example, a distribution of image capturing positions of the traveling record is wider than that of the growth record and is what captured at deviated image capturing positions. When the importance judging section 260 detects the deviation of the image capturing positions in this case, it judges that the importance of the image capturing position is greater than that of the image capturing time. It is noted that the album generating apparatus 100 may enable the user 180 to specify whether the image capturing position is important or the image capturing time is important.

When the importance judging section 260 judges that the importance of the image capturing position is greater than that of the image capturing time, the image capturing position sorting section 264 sorts the plurality of images stored in the image storing section 202 per page in the album based on the image capturing positions stored in the image storing section 202. When the importance judging section 260 judges that the importance of the image capturing time is greater than that of the image capturing position, the image capturing time sorting section 262 sorts the plurality of images stored in the image storing section 202 per page in the album based on the image capturing times stored in the image storing section 202.

It is noted that the image capturing position sorting section 264 sorts the plurality of images stored in the image storing section 202 so that the number of images sorted into each page of the album becomes almost equal based on the distribution of image capturing positions calculated by the distribution-of-image capturing position calculating section 254. Or, the image capturing time sorting section 262 sorts the plurality of images stored in the image storing section 202 so that the number of images sorted into each page of the album becomes almost equal based on the distribution of image capturing times calculated by the distribution-of-image capturing time calculating section 252.

The main image selecting section 212 selects the main image that is to be the primary image in the predetermined page of the album out of the images sorted into the predetermined page by the image capturing time sorting section 262 or the image capturing position sorting section 264. The subsidiary image selecting section 222 also selects the subsidiary images that are to be the images subsidiary to the main image selected by the main image selecting section 212 in the predetermined page of the album out of the images sorted into the predetermined page by the image capturing time sorting section 262 or the image capturing position sorting section 264 based on the contents of the main image selected by the main image selecting section 212. Then, the layout determining section 210 lays out the images sorted by the image capturing time sorting section 262 or the image capturing position sorting section 264 per page into the respective pages of the album.

The object sampling section 206 samples a plurality of objects contained in each of the plurality of images stored in the image storing section 202. Specifically, the object sampling section 206 samples contours of the subject by conducting edge sampling or the like to the image to sample an area of the subject as an object. Then, the number-of-object-image calculating section 208 calculates a number of images, among the plurality of images stored in the image storing section 202, containing the same or similar object with the object sampled by the object sampling section 206 per plurality of objects sampled by the object sampling section 206.

Then, the layout determining section 210 lays out the object contained in a larger number of images calculated by the number-of-object-image calculating section 208 while highlighting more in the album. Specifically, the layout determining section 210 lays out the image containing the object contained in the larger number of images calculated by the number-of-object-image calculating section 208 in a large size.

More specifically, the main image selecting section 212 selects the image containing the object contained in the number of images calculated by the number-of-object-image calculating section 208 which is larger than the reference value set in advance out of the plurality of images stored in the image storing section 202 as the main image that is to be the primary image in the album. Then, the layout determining section 210 lays out the main image selected by the main image selecting section 212 in highlight more than the subsidiary images selected by the subsidiary image selecting section 222.

Further, the trimming section 224 trims an regional image of the object contained in the number of images which is calculated by the number-of-object-image calculating section 208 and which is greater than the reference value set in advance. Then, the layout determining section 210 lays out the regional image of the object trimmed by the trimming section 224 in the album.

The number-of-object-image calculating section 208 calculates a number of images containing the object of the same type with the object sampled by the object sampling section 206 out of the plurality of images stored in the image storing section 202 per the plurality of objects sampled by the object sampling section 206. Then, the layout determining section 210 lays out the object of the type in the images whose number calculated by the number-of-object-image calculating section 208 is greater while highlighting more in the album. For example, the number-of-object-image calculating section 208 may judge that the objects are those of same type when their image capturing positions or image capturing times are close to each other. Because the number-of-object-image calculating section 208 judges that images captured by the user 180 continuously at the same place are those of same type and lays out in highlight in this case, the album adequately reflects the intention of the user 180 who captured the images.

The person recognizing section 230 recognizes whether or not the object sampled by the object sampling section 206 is a person. The person recognizing section 230 judges whether or not the object is a person by means of pattern matching by matching a pattern of contours of the object sampled by edge sampling and the like with a pattern of the human body set in advance. The person recognizing section 230 also identifies a person based on contour profile of a face, shapes of characteristic parts in a face such as eyes, nose and mouth, position of each part in the whole face or positional relationship among the respective parts.

Then, the number-of-object-image calculating section 208 calculates a number of images containing the same person with the person sampled by the object sampling section 206 out of the plurality of images stored in the image storing section 202 per plurality of persons sampled by the object sampling section 206. Then, the layout determining section 210 lays out the person contained in a larger number of images as calculated by the number-of-object-image calculating section 208 while highlighting more in the album. For example, the main image selecting section 212 selects the image containing that person as a main image and the layout determining section 210 lays out the image by highlighting as a main image. Therefore, the person who is contained as a subject in a larger number of images may be laid out in highlight.

It is noted that the number-of-object-image calculating section 208 sets a criterion for judging as a same or similar object in advance in accordance to types of object. For example, when the person recognizing section 230 judges that an object is a person, the number-of-object-image calculating section 208 handles the same person as the same object. Still more, as for an object having such characteristics that it is a rectangular parallelepiped and its actual size is large, the object is judged to be a building and the number-of-object-image calculating section 208 handles it as a similar object even when it is a totally different building. Thus, the number-of-object-image calculating section 208 can count the images in accordance to categories desirable for the appreciator by counting the images per person with respect to the personal subject and by counting the images per category of building with respect to buildings and the like.

It is noted that the image storing section 202 also stores a preliminary image captured in succession before or after the image stored in the image storing section 202 by correlating with each one of the plurality of images stored in the image storing section 202. Specifically, the image capturing device 110 captures the preliminary image before or after the timing when the user 180 presses the release button and records the preliminary image by correlating with the image captured at the timing when the user 180 presses the release button. Then, the image storing section 202 stores the image and the preliminary image by receiving from the image capturing device 110. The object sampling section 206 samples an object contained in each of the plurality of images stored in the image storing section 202.

The momentum calculating section 232 calculates a momentum that indicates a scale of motion of the object sampled by the object sampling section 206. Specifically, the momentum calculating section 232 calculates the momentum of the object sampled by the object sampling section 206 by comparing the image stored in the image storing section 202 with the preliminary image. The area-to-contour ratio calculating section 234 calculates length of contours of the object in the image with respect to an area of the object in the image. Then, the momentum calculating section 232 calculates the momentum of the object to be large when the calculation result of the area-to-contour ratio calculating section 234 is large.

Then, the layout determining section 210 lays out the object whose momentum calculated by the momentum calculating section 232 is larger by highlighting in the album. For example, the layout determining section 210 lays out the image containing the object whose momentum calculated by the momentum calculating section 232 is large in a large size in the album. Specifically, the layout determining section 210 lays out the object whose momentum calculated by the momentum calculating section 232 is large as a main image. Therefore, it becomes possible to generate the album in which a person having a large action is highlighted.

Specifically, the main image selecting section 212 selects the image containing the object whose momentum calculated by the momentum calculating section 232 is larger than a reference value set in advance out of the plurality of images stored in the image storing section 202 as a main image that is to be a primary image in the album. Then, based on the contents of the main image selected by the main image selecting section 212, the subsidiary image selecting section 222 selects subsidiary images that are to be images subsidiary to the main image selected by the main image selecting section 212 in the album out of the plurality of images stored in the image storing section 202. Then, the layout determining section 210 lays out the main image selected by the main image selecting section 212 by highlighting more than the subsidiary images selected by the subsidiary image selecting section 222. It is noted that the trimming section 224 may trim a regional image of the object whose momentum calculated by the momentum calculating section 232 is larger than the reference value set in advance.

The distance calculating section 274 calculates a distance between a first object and a second object in an image containing the first and second objects sampled by the object sampling section 206. It is noted that the distance calculating section 274 may calculate a distance between the first and second objects in a real space. For example, the distance calculating section 274 may calculate the distance between the objects in a real space by recording a focal distance per image region together with the image and by calculating position in the real space per object based on the focal distance per image region and position of the object on the image.

When a number of images containing the first and second objects sampled by the object sampling section 206 is larger than a reference number set in advance in the plurality of images stored in the image storing section 202, the relationship judging section 272 judges that the first object is highly related with the second object. Still more, when the distance calculated by the distance calculating section 274 is short, the relationship judging section 272 may judge that the first object is highly related with the second object. It is noted that the relationship judging section 272 may judge the relationship between the objects recognized as being persons by the person recognizing section 230 to be greater than the relationship between the objects judged as being not persons by the person recognizing section 230. Therefore, when the user 180 traveled in a group of friends for example and there are many images containing the friends, the relationship judging section 272 can judge the relationship of the friends to be high.

Then, the subsidiary image selecting section 222 selects the images containing the second object judged by the relationship judging section 272 to be highly related with the first object contained in the main image selected by the main image selecting section 212 out of the plurality of images stored in the image storing section 202 as the subsidiary images that is to be the images subsidiary to the main image selected by the main image selecting section 212 in the album.

It is noted that the image capturing device 110 may function as the album generating apparatus 100. For example, the image capturing device 110 may generate an album out of the plurality of images captured by the image capturing device 110. The image capturing device 110 may display generated album data on a monitor screen or may output the album data to an output device other than the image capturing device 110 via the communication line 150 such as Internet for example.

The specific subject information getting section 290 obtains an image of a main person in an album. Specifically, the main person inputting section 292 causes one to input the image containing the main person in the album out of the plurality of images stored in the image storing section 202 and position of the main person in the image. For example, the main person inputting section 292 causes the user 180 to input the image containing the main person and the position of the main person in the image. Then, the main person specifying section 294 specifies the image of the main person from the images containing the main person and the position inputted through the main person inputting section 292. Then, the image-of-main person selecting section 296 selects the image containing the main person out of the plurality of images stored in the image storing section 202 by comparing the image of the main person specified by the main person specifying section 294 with subjects contained in the plurality of images stored in the image storing section 202. Then, the main image selecting section 212 selects a main image out of the images selected by the image-of-main person selecting section 296. Therefore, the album generating apparatus 100 can determine the image containing the hero in the album specified by the user 180 as the main image.

It is noted that the main person inputting section 292 may enable one to input an image containing a first main person and position of the first main person as well as an image containing a second main person and position of the second person. Then, the main person specifying section 294 specifies the images of the first main person and the second main person from the image containing the first main person and the position as well as the image containing the second main person and the position inputted through the main person inputting section 292. The image-of-main person selecting section 296 selects the image containing the first main person and the image containing the second main person out of the plurality of images stored in the image storing section 202 by comparing the images containing the first and second main persons specified by the main person specifying section 294 with the subjects contained in the plurality of images stored in the image storing section 202.

Then, the main image selecting section 212 selects the main image out of the images containing the first main person and the images containing the second main person selected by the image-of-main person selecting section 296. Further, based on the contents of the main image selected by the main image selecting section 212, the subsidiary image selecting section 222 selects the subsidiary image that is to be subsidiary to the main image selected by the main image selecting section 212 in the album out of the plurality of images stored in the image storing section 202.

Then, the layout determining section 210 determines layout of the main and subsidiary images so that a number of the first main persons contained in the plurality of images laid out in one and same page becomes almost equal with a number of the second main persons. The layout determining section 210 also determines layout of the main and subsidiary images so that an area of the first main person and an area of the second main person contained in the page of the album containing the first and second main persons becomes almost equal. Thereby, the album generating apparatus 100 can prevent one of the plurality of persons specified as being the heroes in the album from being highlighted in the page in advance.

The template storing section 214 stores templates of the album containing a plurality of images. Then, the characteristic color sampling section 226 samples a characteristic color out of a plurality of colors contained in the main image selected by the main image selecting section 212. Based on the characteristic color sampled by the characteristic color sampling section 226, the template coloring determining section 228 determines coloring of the template of the album containing the plurality of images. Thereby, the album generating apparatus 100 can generate the album having the coloring harmonized with the color in the main image.

The image sorting section 240 sorts the plurality of images stored in the image storing section 202 per page in the album in accordance to an image capturing condition in capturing the images. Specifically, the image sorting section 240 sorts the plurality of images stored in the image storing section 202 per page in the album in accordance to shutter speed in capturing the images. Then, the main image selecting section 212 selects each main image per image capturing condition sorted by the image sorting section 240. The subsidiary image selecting section 222 also selects each subsidiary image per image capturing condition sorted by the image sorting section 240. Thereby, the album generating apparatus 100 can generate the album having uniformity in each page because it can unify the image capturing condition in each page.

The light source specifying section 256 specifies a type of a main light source in capturing the image from the contents of the image of the plurality of images stored in the image storing section 202. Specifically, the light source specifying section 256 specifies the type of the main light source in capturing the image based on color balance in a range of certain color, i.e., an achromatic color, whose average luminance in the image is larger than preset luminance. Then, the image sorting section 240 sorts the plurality of images stored in the image storing section 202 per page in the album corresponding to the type of the light source specified by the light source specifying section 256. Thereby, the image sorting section 240 can distinguish images captured under artificial illumination from images captured under the sun and can sort them to each page. Therefore, the album generating apparatus 100 can generate the album having uniformity with respect to a light source in each page.

The compositional similarity calculating section 258 calculates a degree of compositional similarity among the plurality of images stored in the image storing section 202. Then, the image sorting section 240 sorts the images calculated to have a high degree of similarity by the compositional similarity calculating section 258 into the same page in the album. Then, among the plurality of images sorted by the image sorting section 240 into the same page, the layout determining section 210 lays out the page by using the images calculated to have lower similarity by the compositional similarity calculating section 258. Thereby, the album generating apparatus 100 can generate the album having uniformity in terms of composition in each page.

The main subject sorting section 266 sorts the images into each page based on a main subject. The composite information storing section 216 stores composite information indicating, per page, whether the image sorted based on the distribution of image capturing times calculated by the distribution-of-image capturing time calculating section 252 is to be disposed in the page or the image sorted by the main subject sorting section 266 based on the main subject is to be disposed in the page. Then, the layout determining section 210 lays out the image sorted by the image sorting section 240 into the page storing the composite information of the composite information storing section 216 instructing to dispose the image sorted based on the distribution of image capturing times into the page and lays out the image sorted by the main subject sorting section 266 to the page storing the composite information of the composite information storing section 216 indicating to dispose the image sorted by the main subject to the page. Thereby, the album generating apparatus 100 can generate the album occasionally having pages arranged in a row other than a row arranged in a time-series manner in the album in which pages are arranged in the time-series manner. Thus, the album generating apparatus 100 can generate the album having a story while having an accent.

It is noted that the composite information storing section 216 stores the composite information, per page, indicating whether the image sorted based on the distribution of image capturing positions calculated by the distribution-of-image capturing position calculating section 254 is to be disposed in the page or the image sorted by the main subject sorting section 266 based on the main subject is to be disposed in the page. Then, the layout determining section 210 lays out the image sorted by the image sorting section 240 into the page storing the composite information of the composite information storing section 216 instructing to dispose the image sorted based on the distribution of image capturing positions to the page and lays out the image sorted by the main subject sorting section 266 to the page storing the composite information of the composite information storing section 216 instructing the image sorted based on the main subject to the page. Thereby, the album generating apparatus 100 can generate the album occasionally having pages sorted by the subject in the album in which the pages are sorted per position for example. Therefore, the album generating apparatus 100 can generate the album having a story while having an accent.

Thus, the album generating apparatus 100 described above can generate the album having the images adequately sorted and allocated to each page and having a typical image, selected out of them, as the main image of each page. Still more, the album generating apparatus 100 can combine the main image and the subsidiary image stored in each page in a combination desirable for the appreciator. Accordingly, the user 180 can obtain the desirable album without taking so much time.

Figure 4:
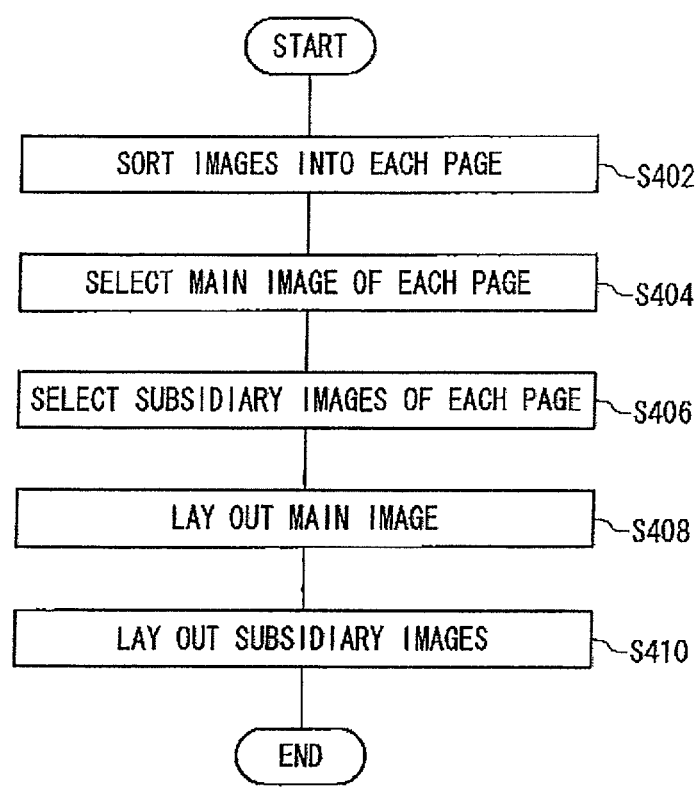
FIG. 4 is a flowchart showing one exemplary processing flow for generating the album.

FIG. 4 is a flowchart showing one exemplary processing flow for generating the album. The image sorting section 240 sorts the images into each page in Step S402. The main image selecting section 212 selects the main image out of the images sorted in Step S402 into each page in Step S404. The subsidiary image selecting section 222 also selects the subsidiary image based on the contents of the main image out of the images sorted in Step S402 into each page in Step S406. Then, the layout determining section 210 lays out the main image selected in Step 404 in Step S408. The layout determining section 210 also lays out the subsidiary image selected in Step S406 in Step S410. It is noted that as for the procedure for generating the album, the layout determining section 210 may determined the number of subsidiary images to be stored based on the layout of the main image after determining the layout of the main image, beside the procedure shown in FIG. 4. Then, the album generating apparatus 100 may select the subsidiary images corresponding to the number of subsidiary images and may lay out the subsidiary images.

Figure 5:
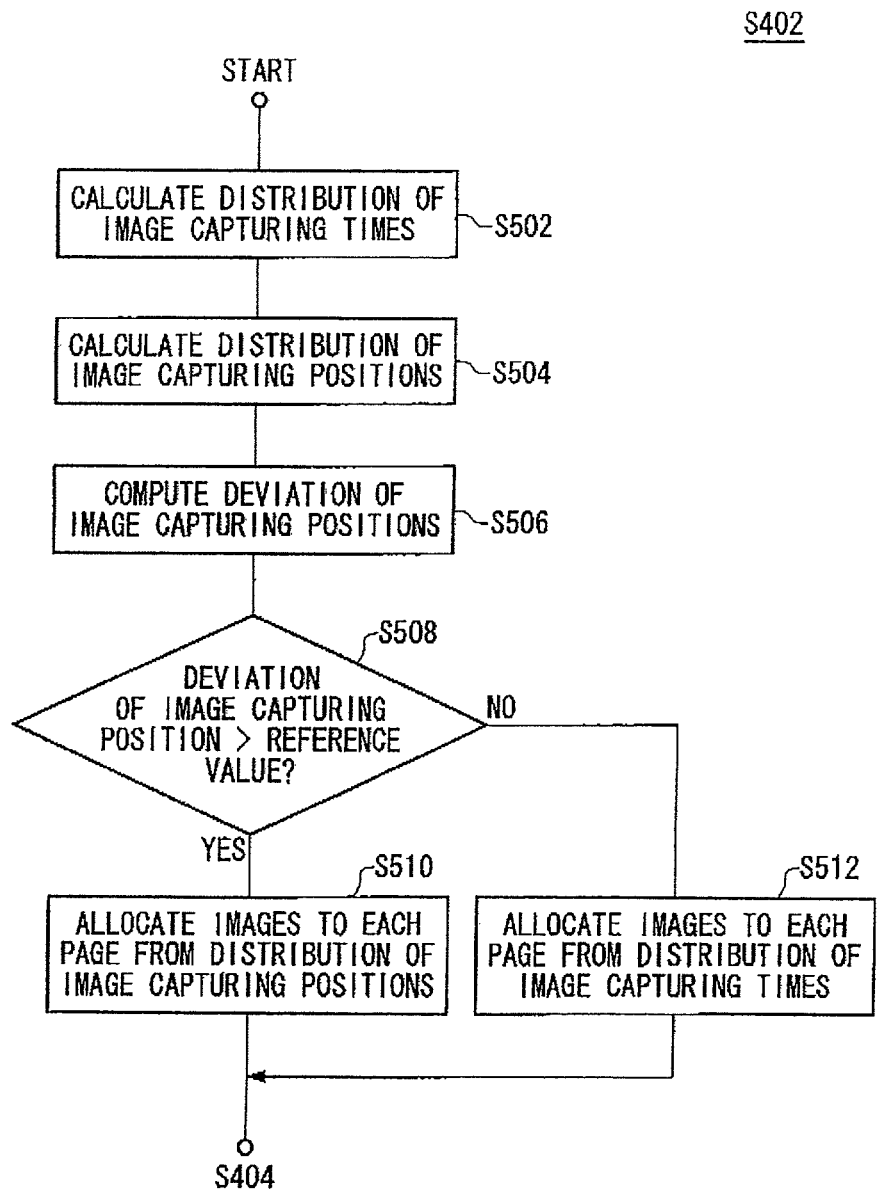
FIG. 5 is a flowchart showing one exemplary processing flow for sorting images.

FIG. 5 is a flowchart showing one exemplary process flow for sorting the images . FIG. 5 shows the detail of the process in Step S402 for sorting the images in FIG. 4. The distribution-of-image capturing time calculating section 252 calculates a distribution of image capturing times of the plurality of images in Step S502. Then, the distribution-of-image capturing position calculating section 254 calculates a distribution of image capturing positions of the plurality of images in Step S504. Then, the importance judging section 260 computes deviation of the image capturing position based on the distribution of image capturing positions calculated in Step S502 in Step S506.

The importance judging section 260 judges whether or not the deviation of the distribution of image capturing positions computed in Step S506 is larger than a reference value set in advance in Step S508. When the deviation of the distribution of image capturing positions is larger than the reference value set in advance in Step S508, the importance judging section 260 allocates the images to each page based on the distribution of image capturing positions in Step S510. When the deviation of the image capturing position is less than the reference value set in advance in Step S508, the importance judging section 260 allocates the images to each page based on the distribution of image capturing times in Step S512. The images may be allocated to the page per region where the images were captured or to the page per date when the images were captured by the process described above for sorting the images. Accordingly, the album may be generated in accordance to the category desirable for the appreciator.

Figure 6:
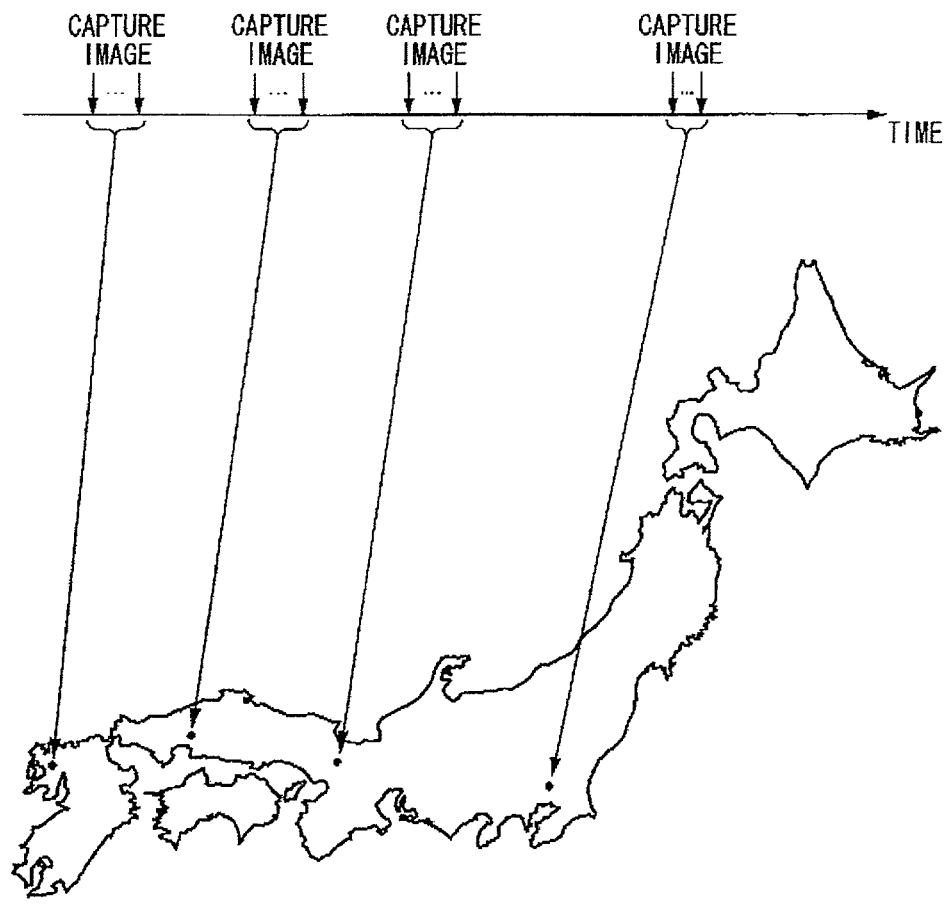
FIG. 6 is a drawing showing one exemplary case when it is desirable to allocate images per page by a distribution of image capturing positions.

FIG. 6 shows one exemplary case when the allocation per page by means of the distribution of image capturing positions is desirable. FIG. 6 shows a case when an album is to be generated by using images collectively captured in each region of Nagasaki, Hiroshima, Kyoto and Tokyo. In this case, while the user captured the images at each visiting place, the user traveled to the next tourist spot by traveling a distance fully exceeding a positional range of the image capturing activity in each region. In such a case, the importance judging section 260 determines that the deviation of the image capturing position is large and judges that the image capturing position is important more than the image capturing time. Thus, the album generating apparatus 100 can adequately allocate the images to the page per region corresponding to the image capturing position of the image.

Figure 7:
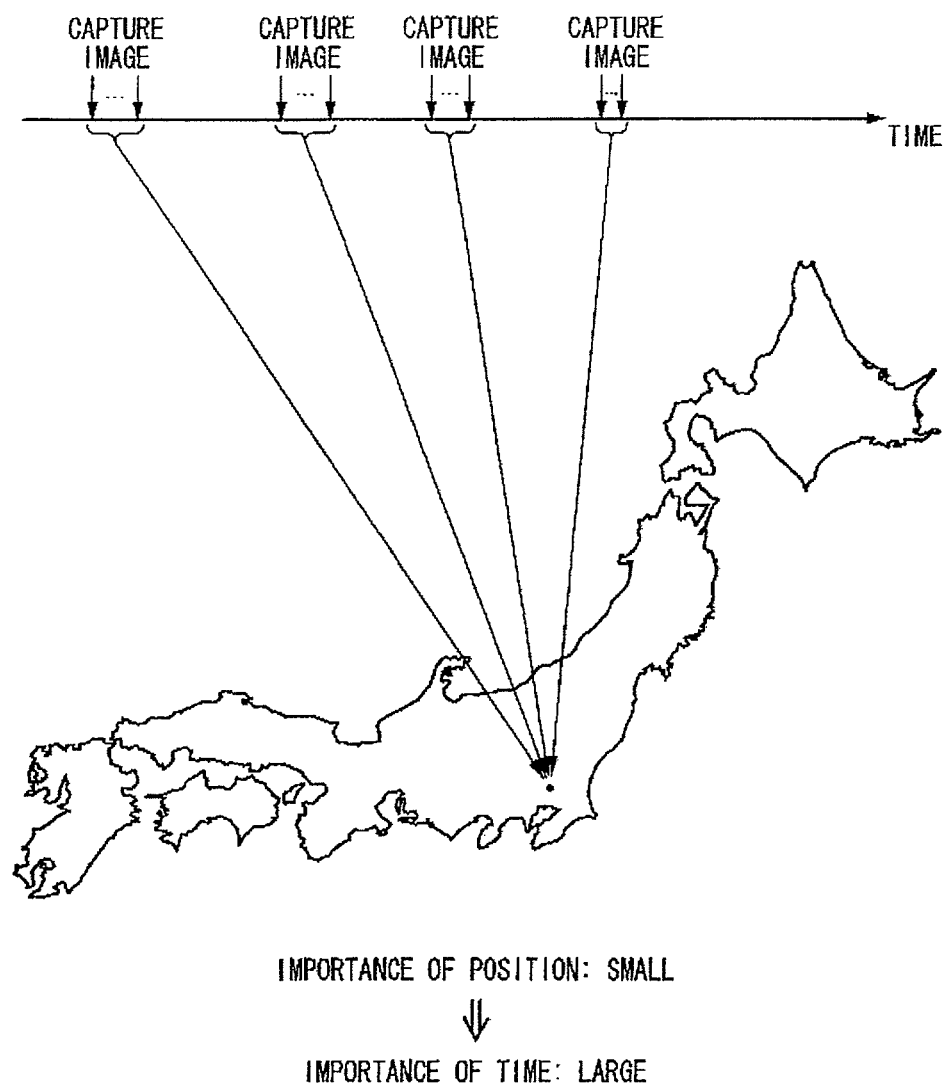
FIG. 7 is a drawing showing one exemplary case when it is desirable to allocate images per page by a distribution of image capturing times.

FIG. 7 shows one exemplary case when allocation per page by the image capturing time is desirable. FIG. 7 shows a case when the user 180 captured images almost in the same region and a period of time during which the images were captured is widely dispersed like a case of capturing images for recording growth of a child for example. In this case, the importance judging section 260 determines that the deviation of the image capturing position is small and judges that the importance of the image capturing time is greater than that of the image capturing position. Thus, the album generating apparatus 100 can sort the images captured to record the child's growth in accordance to the image capturing periods and can generate the album in which each page is arranged in order of the image capturing periods. Therefore, the user 180 can appreciate the state how the child has been growing every time when the user 180 turns the pages and can appreciate the album pleasantly without feeling any sense of incompatibility. It is noted that the album generating apparatus 100 may not lay out the images sorted within the same page based on the distribution of image capturing times even in sorting the images based on the distribution of image capturing times.

Figure 8:
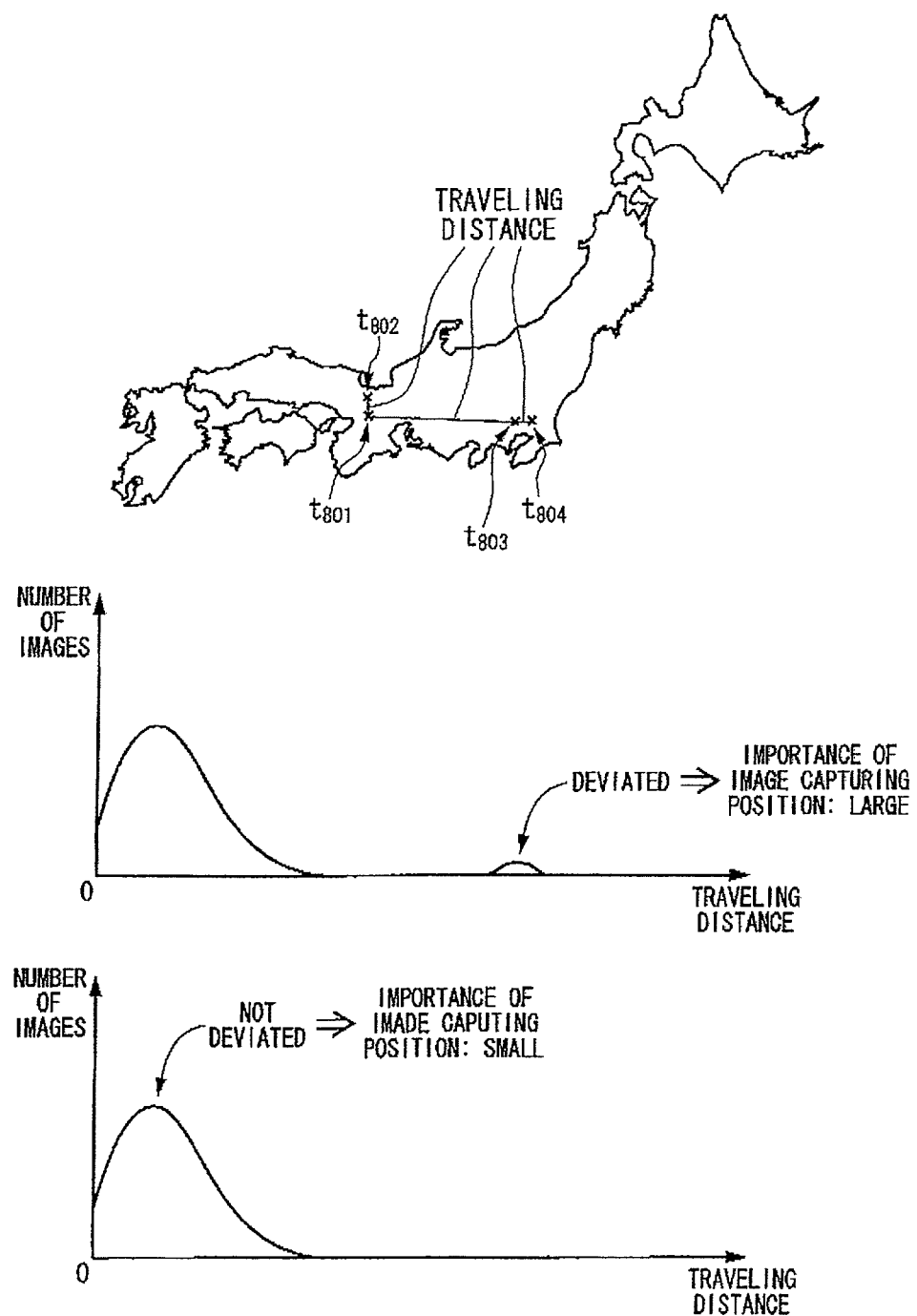
FIG. 8 shows one exemplary method for judging importance of image capturing position.

FIG. 8 shows one exemplary method of the importance judging section 260 in judging importance of the distribution of image capturing positions. For each of the images stored in the image storing section 202, the distribution-of-image capturing position calculating section 254 calculates a distance between image capturing position where the image was captured and image capturing position of an image captured immediately before that image as a traveling distance traveled to capture the images. Then, the distribution-of-image capturing position calculating section 254 calculates a distribution of number of images with respect to the calculated traveling distance.

Based on the calculated number of images, the importance judging section 260 computes a number of images captured at places distant more than the traveling distance obtained by multiplying a preset factor to a variance of the traveling distance to compute a ratio of the number of images to the whole number of images as the deviation of the distribution of image capturing positions. Thereby, the importance judging section 260 can judge that the image capturing position is more important than the image capturing time when the user 180 generates an album recording capital cities of the European countries when the user visited them for example.

Figure 9:
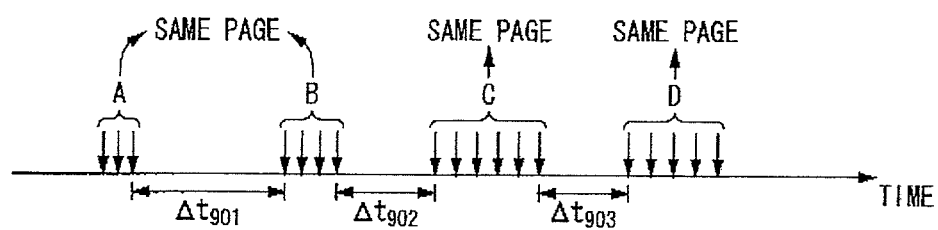
FIG. 9 is a chart showing one exemplary allocation of images per page based on the distribution of image capturing times.

FIG. 9 shows one exemplary allocation of images per page based on the distribution of image capturing times. The image capturing time sorting section 262 computes a value obtained by dividing a number of captured images by a total number of pages of the album as a number of images to be allocated to one page. For example, the image capturing time sorting section 262 judges the number of images per page as 4.5 images in case of FIG. 9. Then, the distribution-of-image capturing time calculating section 252 computes intervals of image capturing times of the images stored in the image storing section 202 in order of the image capturing times.

Then, the image capturing time sorting section 262 sorts the images into image groups in order of those having longer intervals between the image capturing times, e.g., $\Delta t901$, $\Delta t903$, $\Delta t902$ and so on. For example, the image group A is separated from the other image groups and is sorted at position of the image capturing interval $\Delta t901$. Then, the image capturing time sorting section 262 determines a category in which a number of images of the sorted image group is almost equal to a number of images to be allocated to one page and allocates each image group in the determined category to one and same page. In case of FIG. 9, the image capturing time sorting section 262 sorts images contained in image groups A and B, images contained in an image group C and images contained in an image group D, respectively, into one and same page. It becomes possible to allocate images captured in nearby time adequately to the pages while preventing from being stored in totally separate pages because the image capturing time sorting section 262 sorts the images into each page based on the distribution of image capturing times as described above.

Figure 10:
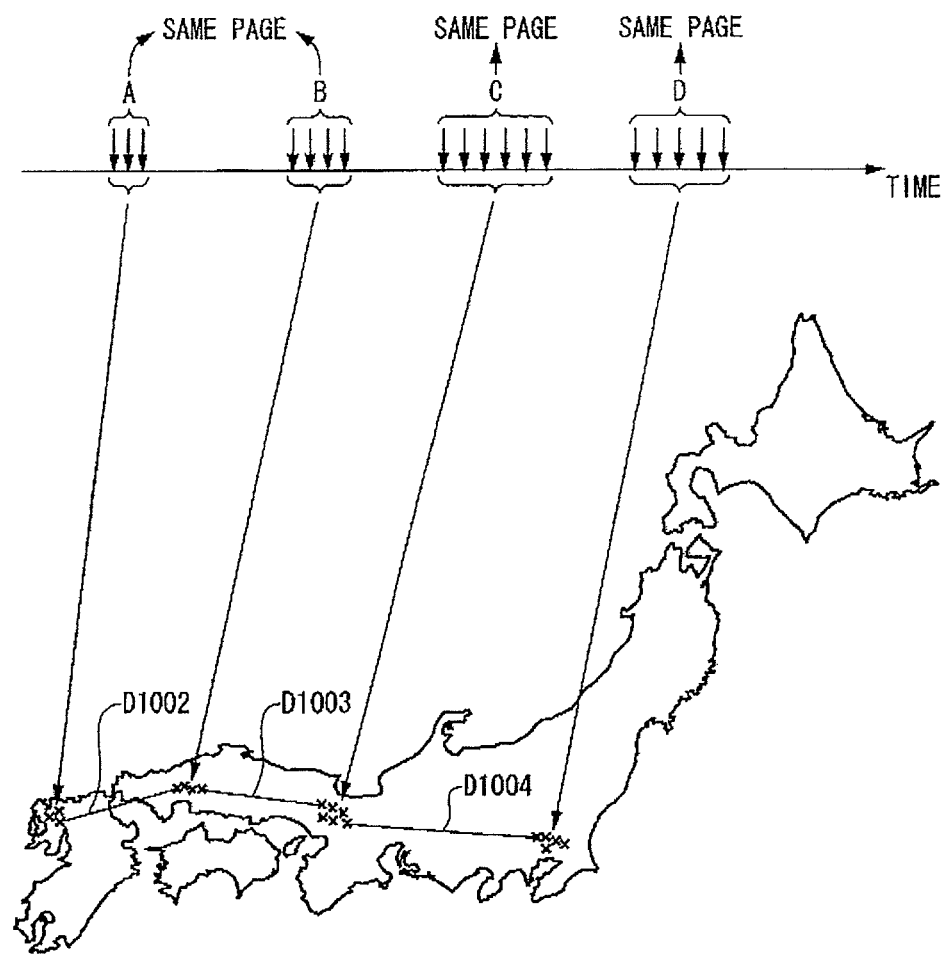
FIG. 10 is a chart showing one exemplary allocation of images per page based on the distribution of image capturing positions.

FIG. 10 shows one exemplary image allocation per page based on the distribution of image capturing positions. The image capturing position sorting section 264 computes intervals of image capturing positions of the images stored in the image storing section 202 in order of image capturing times. The image capturing time sorting section 262 sorts the images in order of those having longer intervals between the image capturing positions, e.g., D1004, D1002, D1003 and so on in case of FIG. 10. For example, the image groups A, B and C are sorted separately from the image group D at the position of the image capturing interval D1004. Then, the image capturing time sorting section 262 determines a category in which a number of images of the sorted image group is almost equal to a number of images to be allocated to one page and allocates each image group in the determined category to one and same page. In case of FIG. 10, the image capturing position sorting section 264 sorts the images contained in the image groups A and B, the images contained in the image group C and the images contained in the image groups D, respectively, into one and same page.

Figure 11:
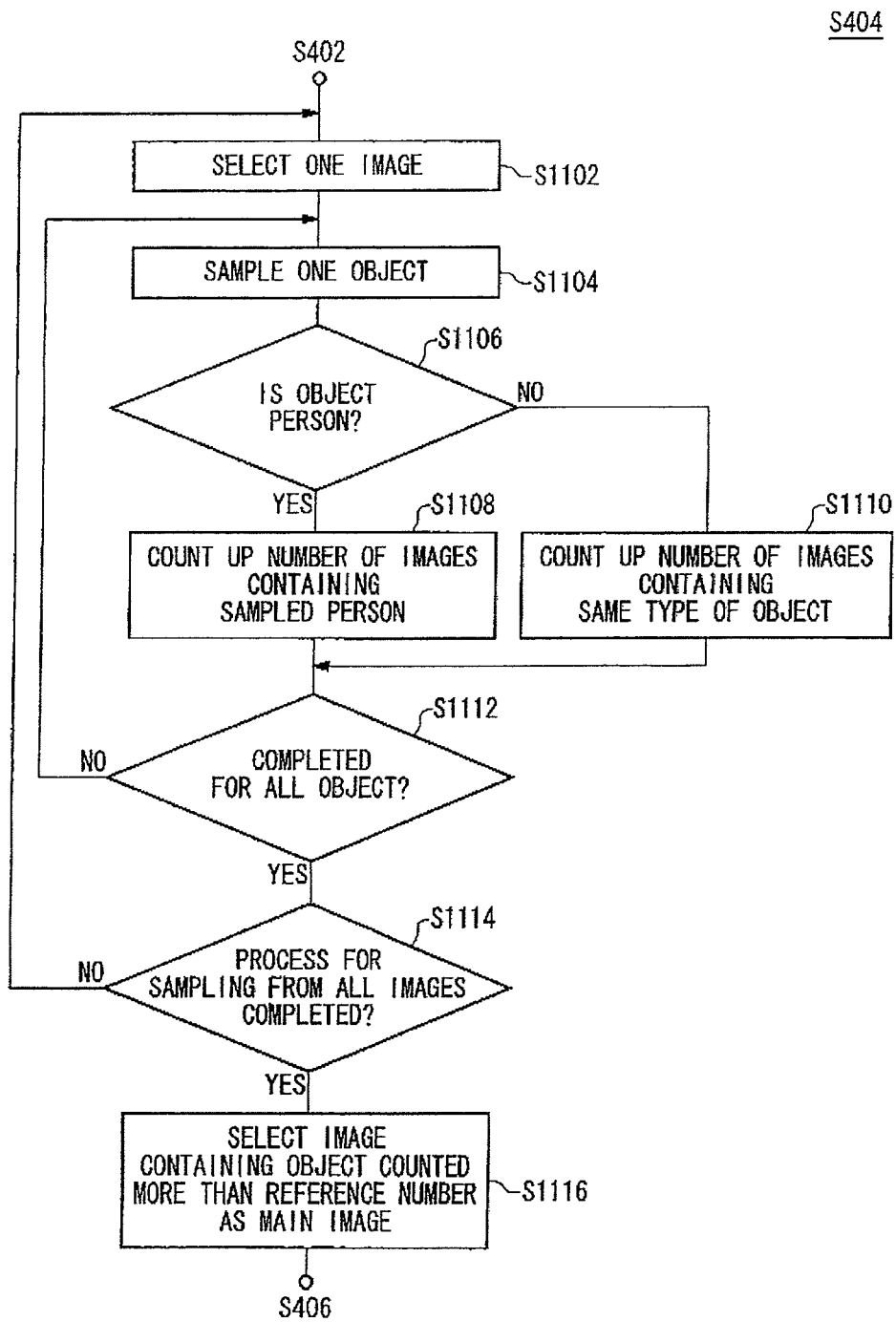
FIG. 11 is a flowchart showing one exemplary processing flow for selecting a main image.

FIG. 11 is a flowchart showing one exemplary processing flow for selecting the main image. FIG. 11 shows a detail of the process (S404) for selecting the main image in FIG. 4. The object sampling section 206 selects one image out of the images sorted by the image sorting section 240 in Step S1102. Then, the object sampling section 206 detects a plurality of objects by sampling contours of a plurality of subjects by means of edge sampling or the like out of the selected image and samples one object among them in Step S1104. The person recognizing section 230 then judges whether or not the object sampled in Step S1104 is a person in Step S1106.

When the sampled object is judged to be a person in Step S1106, the number-of-object-image calculating section 208 counts up a number of images containing the object per person in Step S1108. When it is judged that the sampled object is not a person in Step S1106, the number-of-object-image calculating section 208 discriminates the same type of object and counts up a number of images containing the object per type of the object.

Then, the object sampling section 206 judges whether or not the counting process of the number-of-object-image calculating section 208 has been completed for all objects contained in one image selected in Step S1102 in Step S1112. When it is judged in Step S1112 that the counting process has not been completed for all of the objects, the process is returned to Step S1104 to select another object. When it is judged in Step S1112 that the counting process has been completed for all of the objects, it is judged whether or not the process for sampling objects from all of the images sorted by the image sorting section 240 has been completed in Step S1114. When it is judged in Step S1114 that the process for sampling from all of the images has not been completed, the process is returned to Step S1102 to select another image anew.

When it is judged in Step 1114 that the process for sampling objects from all of the images has been completed, the main image selecting section 212 discriminates a person or a type of an object counted more than a reference number of images set in advance among the number of images per person or the number of images of objects per type calculated in Step S1108 or S1110 and selects an image per selected person or an image containing the object contained in the type of the selected object as a main image in Step S1116. Thus, the album generating apparatus 100 can generate the album desirable for the user 180 because it automatically selects the main image out of the images of the subjects which were captured more by the user 180 having concern to that.

Figure 12:
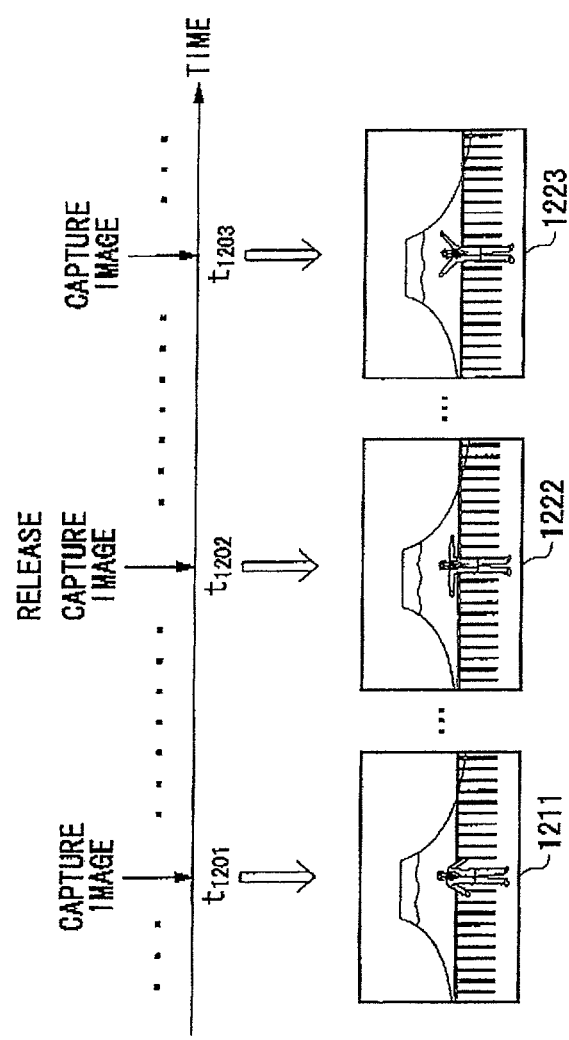
FIG. 12 is a drawing showing one exemplary method for calculating a momentum of an object.

FIG. 12 shows one exemplary method for calculating a momentum of an object. At timing when the user 180 presses a release button, the image capturing device 110 captures an image 1222 as well as preliminary images 1221, 1223 and so on) at timing before/after that timing. The momentum calculating section 232 carries out edge sampling or the like to differential images between the preliminary image 1221 and the image 1222 and between the image 1222 and the preliminary image 1223 for example to sample contours of the object moved while capturing the images. Then, the momentum calculating section 232 calculates the movement of the object on the image as a momentum of the object. In case of FIG. 12, motion of both arms of a person, i.e., a subject, remains in the differential images, the momentum calculating section 232 discriminates the movement of the both arms. Then, the main image selecting section 212 selects the image containing the object containing the subject whose movement is large as a main image. Thereby, the album generating apparatus 100 can select the image containing the subject having a large motion as the main image of the album.

It is noted that the album generating apparatus 100 may calculate the momentum of each sampled object based on relative movement with another object. For example, the momentum calculating section 232 may calculate variation of relative distance between the both arms of the subject and a mountain on the back in each of the preliminary image 1221 and the image 1222 as the momentum. Thereby, the album generating apparatus 100 can adequately calculate the momentum of the object even when the user 180 captured images while panning/tilting the image capturing device 110.

It is noted that the image capturing device 110 may record image capturing conditions in capturing the images and preliminary images and the album generating apparatus 100 may calculate the momentum of the object based on the image capturing conditions. For example, the image capturing device 110 records moving speed of focal point of the image capturing device 110 in the real space at the timing in capturing the image and preliminary images. Then, the album generating apparatus 100 may calculate the momentum of the object based on the moving speed of the focal point in the real space and the movement of the object on the images judged from the image and preliminary images.

Figure 13:
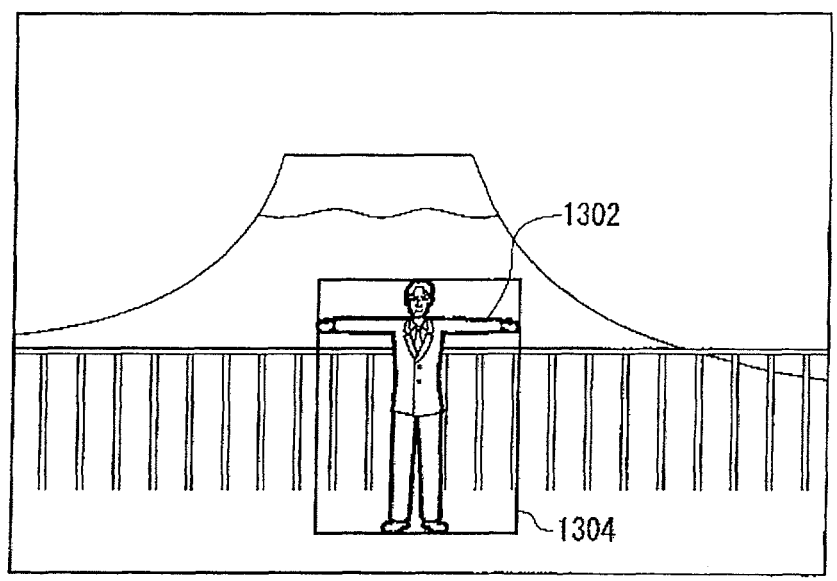
FIG. 13 is a drawing showing one exemplary method for judging importance of an object.

FIG. 13 shows one exemplary method for judging importance of an object. The momentum calculating section 232 calculates a length of a contour line 1302 of the object sampled by the object sampling section 206 and multiplies a factor proportional to the calculated length with the movement calculated by the momentum calculating section 232. Beside that, the momentum calculating section 232 may calculate a total length of sides of a circumscribing rectangle 1304 circumscribing the object sampled by the object sampling section 206 as a length of a contour line of the object. It allows the image containing the subject that occupies a larger image range to be preferentially selected among moving subjects, so that the album generating apparatus 100 can generate the album desirable for the user 180.

Figure 14:
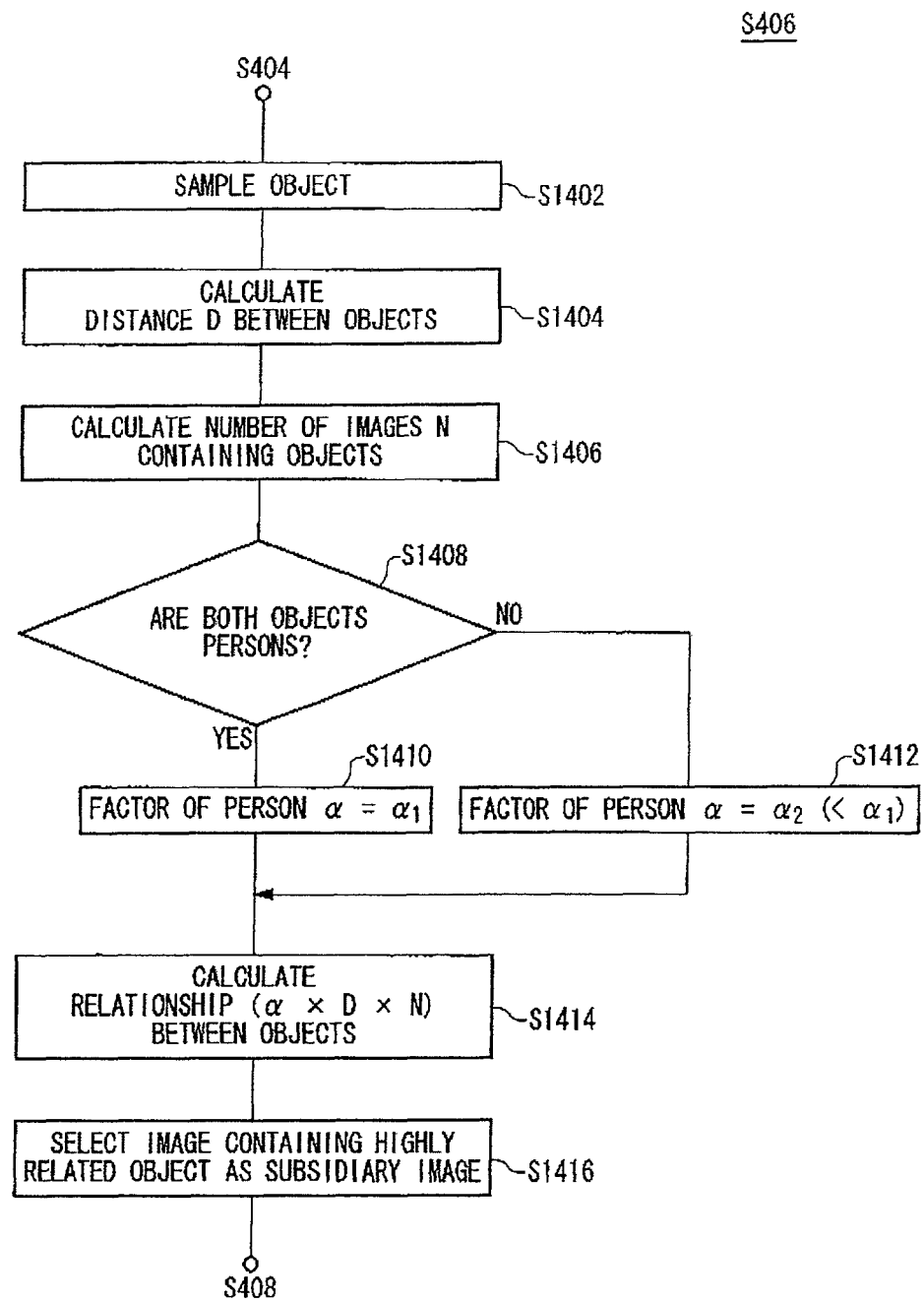
FIG. 14 is a flowchart showing one exemplary processing flow for selecting a subsidiary image.

FIG. 14 is a flowchart showing one exemplary processing flow for selecting subsidiary images. FIG. 14 shows a detail of the process for selecting the subsidiary images in Step S406 in FIG. 4. The object sampling section 206 samples objects in Step S1402. Then, the distance calculating section 274 calculates a distance D between the objects on the image or on the real space for each combination of the objects contained in one image in Step S1404. It is noted that in Step S1404, the distance calculating section 274 may calculate a distance between positions of center of gravity of the sampled objects in the image as the distance D of the objects in the image.

Then, the number-of-object-image calculating section 208 calculates a number of images N containing the objects in the same image. Then, the person recognizing section 230 judges whether or not the objects sampled in Step S1402 are both persons in Step S1408. When it is judged in Step S1408 that the objects are both persons, α1 is set as a factor of person α and when it is judged in Step S1408 that at least one of the objects is not a person, α2 that is smaller than α1 is set as the factor of person α.

Then, the relationship judging section 272 calculates a product of the distance D calculated in Step S1404, the number of images N calculated in Step S1406 and the factor of person a set in Step S1410 or S1412 as the relationship for each of the combination of two objects in Step S1414. The subsidiary image selecting section 222 selects an object whose relationship of combination with the object contained in the image selected as the main image is larger than a reference value of relationship set in advance based on the relationship of combination of the objects calculated in Step S1414. Then, the subsidiary image selecting section 222 selects the image containing the selected object as the subsidiary image in Step S1416. As described above, the album generating apparatus 100 can automatically select the image of a person captured together with a person captured in the main image as the subsidiary image. Accordingly, the user 180 can appreciate the album without feeling a sense of incompatibility.

Figure 15:
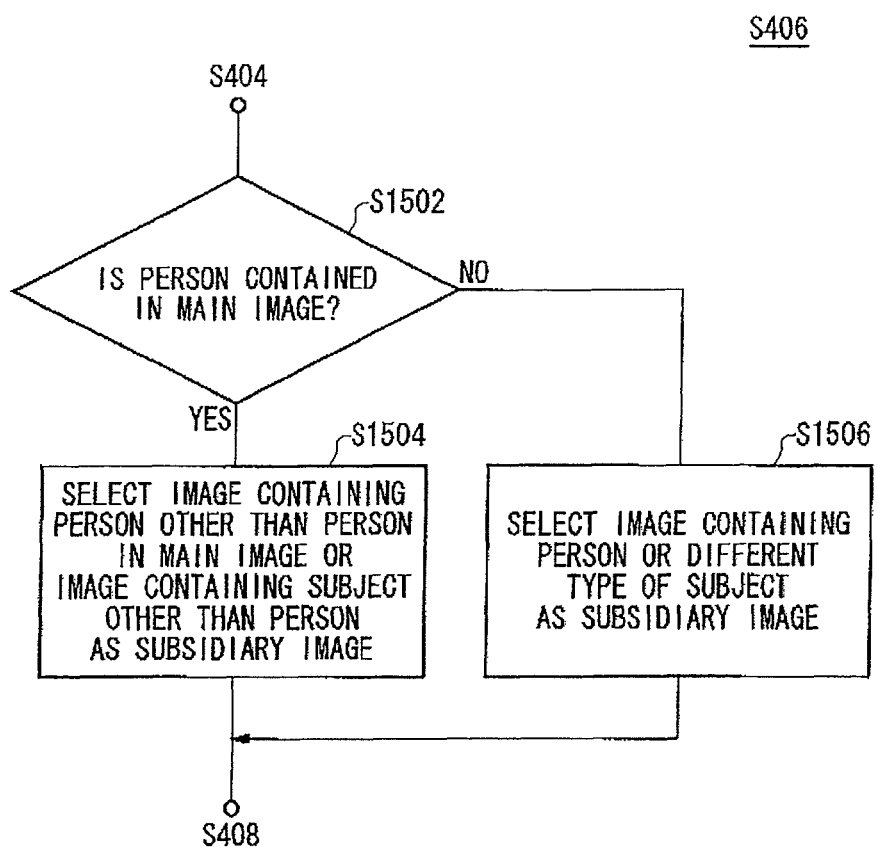
FIG. 15 is a flowchart showing another exemplary processing flow for selecting a subsidiary image.

FIG. 15 is a flowchart showing another exemplary processing flow for selecting the subsidiary images. FIG. 15 shows another example of a detail of the process (S406) for selecting the subsidiary images in FIG. 4. The person recognizing section 230 judges whether or not a main image selected by the main image selecting section 212 contains a person in Step S1502. When it is judged in Step S1502 that the main image contains a person, the subsidiary image selecting section 222 selects an image containing a person other than the person in the main image or an image containing no object judged by the person recognizing section 230 as a person as a subsidiary image in Step S1504.

When it is judged in Step S1502 that the main image contains no person, the subsidiary image selecting section 222 selects an image containing a person or an image containing a different type of subject as a subsidiary image in Step S1506. Thereby, the subsidiary image selecting section 222 can prevent the images stored in one and same page from becoming only images containing the same person or becoming only images containing the same type of subject and can generate the album in which the contents of the images stored in each page are well balanced.

Figure 16:
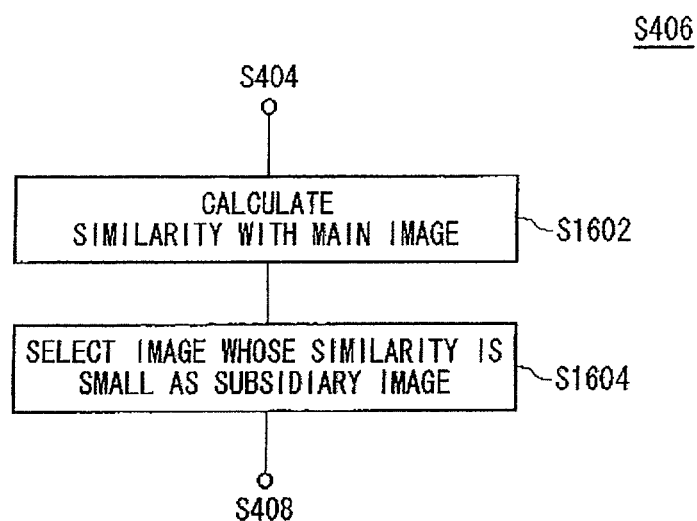
FIG. 16 is a flowchart showing a still other exemplary processing flow for selecting a subsidiary image.

FIG. 16 is a flowchart showing a still other exemplary flow for selecting the subsidiary images. The similarity calculating section 242 calculates similarity of the main image selected by the main image selecting section 212 with another image in Step S1602. Specifically, the similarity calculating section 242 calculates the similarity to be small for an image having a big time difference from image capturing time of the main image. Beside that, the similarity calculating section 242 may calculate the similarity to be small for an image whose image capturing position is largely distant from that of the main image. Still more, the similarity calculating section 242 may calculate the similarity to be small for an image having different colors from colors contained in the main image to be small. Further, the similarity calculating section 242 may calculate the similarity to be small for an image whose focal distance is largely different from that of the main image.

Then, the subsidiary image selecting section 222 selects an image whose similarity with the main image, calculated in Step S1602, is small as a subsidiary image in Step S1604. Thereby, the subsidiary image selecting section 222 can select the image having the contents not similar to that of the main image as the subsidiary image. For example, the album generating apparatus 100 may generate a page in which a landscape image whose focal distance is long and a snap shot whose focal distance is short are combined. Thereby, it becomes possible to prevent the page of the album from being composed of only landscape images whose focal distance is long and from becoming dull.

Figure 17:
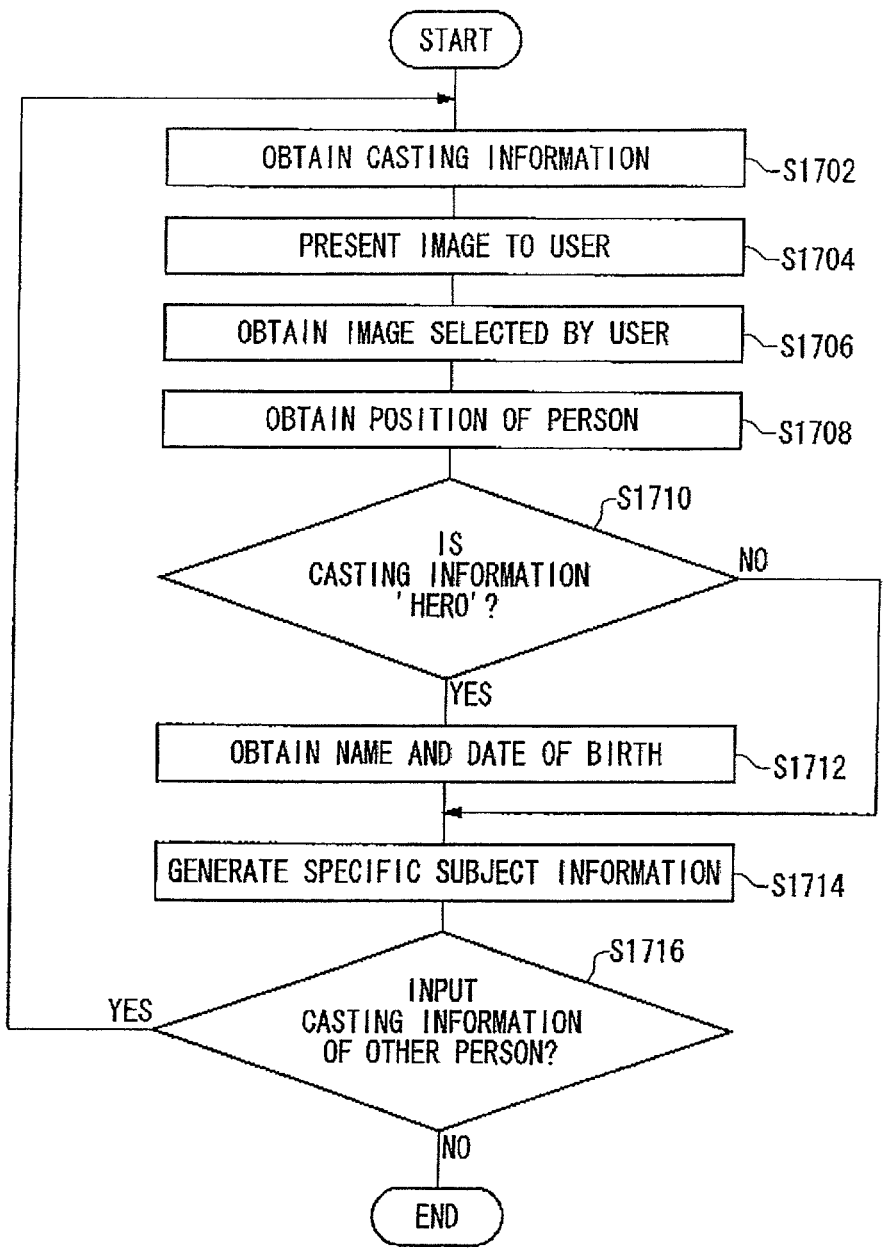
FIG. 17 is a flowchart showing one exemplary processing flow of a specific subject information getting section.

FIG. 17 is a flowchart showing one exemplary processing flow of the specific subject information getting section 290. The specific subject information getting section 290 obtains specific subject information which can be used in sorting the images, e.g., in sorting images by the subject by the main subject sorting section 266, in Step S402 in FIG. 4, in selecting the main image in Step S404 and selecting the subsidiary images in Step S406 for example. The specific subject information getting section 290 obtains casting information that indicates a role of a person contained in the image of the album by enabling the user 180 to input it in Step S1702. For example, the specific subject information getting section 290 requests the user 180 to input "Hero" representing the hero of the album, "Father", "Mother", "Brother" and "Sister" representing, respectively, the father, mother, brother and sister of the hero, as well as "Friend" representing a friendship with the hero, as casting information.

Then, the specific subject information getting section 290 displays the images stored in the image storing section 202 to present to the user 180 in Step S1704. The specific subject information getting section 290 also causes the user 180 to select an image containing a person having a role in the casting information inputted in Step S1702 to obtain the image in Step S1706. At this time, the specific subject information getting section 290 stores a file name of the selected image. Then, the specific subject information getting section 290 causes the user 180 to input position of that person in the image selected in Step S1706 in Step S1708. For example, the specific subject information getting section 290 may cause the user 180 to input the position of the person by requesting the user 180 to press buttons indicating Left, Center, Right and the like. Then, the specific subject information getting section 290 judges whether or not the casting information inputted in Step S1702 is "Hero" in Step S1710. When it is judged in Step S1710 that the casting information is "Hero", the specific subject information getting section 290 obtains the name and date of birth of that person from the user 180 in Step S1712.

Then, in Step S1714, the specific subject information getting section 290 generates specific subject information containing the casting information inputted in Step S1702, the file name of the file selected in Step S1706, the position inputted in Step S1708 and the name and date of birth obtained in Step S1710. It is noted that when it is judged in Step S1710 that the casting information is not "Hero", the specific subject information getting section 290 shifts the process to Step S1714 to generate specific subject information containing the casting information inputted in Step S1702, the file name of the file selected in Step S1706 and the position inputted in Step S1708.

Then, the specific subject information getting section 290 asks the user 180 whether or not specific subject information of another person is to be inputted and judges whether or not casting information of the other person is inputted from the input of the user 180 in Step S1716. When it is judged that casting information of the other person is to be inputted in Step S1716, the specific subject information getting section 290 shifts the process to Step S1702 to get the casting information of the other person. When it is judged in Step S1716 that casting information of the other person is not inputted, the process ends.

As described above, the album generating apparatus 100 obtains the role of the person in the album by causing the user 180 to specify the person who is to appear in the album and the role thereof in the album. Therefore, the album generating apparatus 100 can adequately determine the disposition of the images in the album in accordance to the role of the person in the album.

FIG. 18 shows one exemplary contents of the specific subject information generated by the specific subject information getting section 290. The specific subject information 1802, 1804 and 1806 are specific subject information specifying, respectively, the hero, a brother of the hero and a friend of the hero in the album. The specific subject information 1802, 1804 and 1806 have Name field indicating the name of the person, File field indicating a file name of an image, Position field indicating position in the image, Casting field indicating casting information and Date of Birth field indicating date of birth, respectively. Although the specific subject information of the hero contains individual information such as the name and date of birth, such individual information is not contained in the specific subject information of the person other than the hero. Accordingly, since it is not necessary to input personal information of the person other than the hero, there will be almost no problem even if the data is looked in inputting through a kiosk terminal or even if the data is looked furtively on a communication line in inputting each information contained in the specific subject information through Internet and the like. The specific subject information getting section 290 may also generate specific subject information in which inputted personal information is cryptographed as for the specific subject information indicating the hero.

Figure 19:
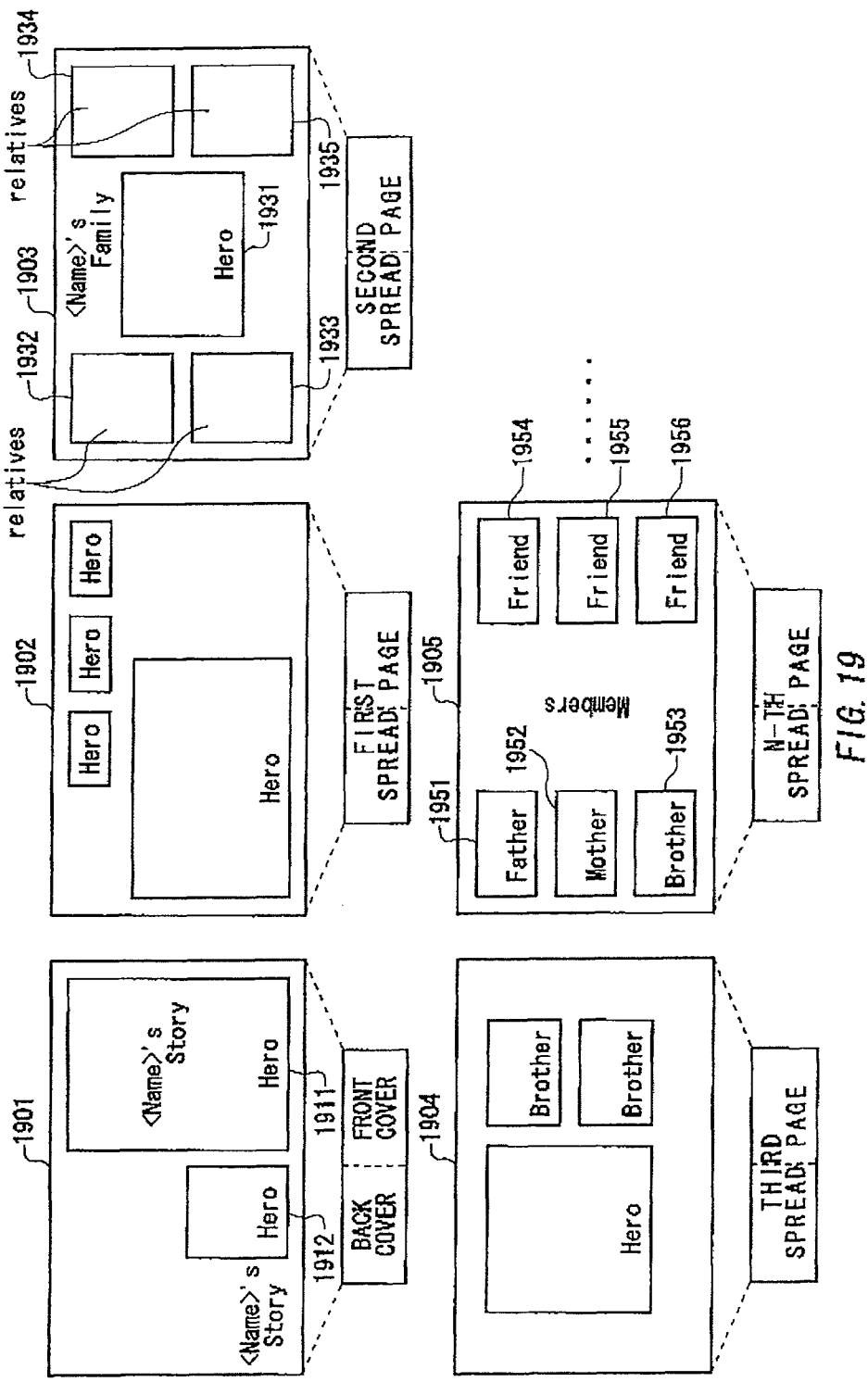
FIG. 19 shows exemplary templates.

FIG. 19 shows exemplary templates stored in the template storing section 214. The template 1901 shows one exemplary template of a back and front covers of the album and templates 1902 through 1905 show exemplary templates of spread pages. The casting information of a person contained in an image to be fitted into each image frame is defined in each image frame indicated by the templates. For example, it is so defined that images containing the person whose Casting field is Hero are fitted into image frames 1911 and 1912 indicated in the template 1901. Still more, it is so defined that images containing persons whose Casting field are Father, Mother and Brother, respectively, are fitted into image frames 1951 through 1953 in the template 1905.

In selecting the image to be fitted into each image frame, the layout determining section 210 selects specific subject information having casting information defined in each image frame. Then, the layout determining section 210 samples an image of person from an image range of a predetermined range from the position of Position field in an image having a file name shown in File field contained in the selected specific subject information. Then, the layout determining section 210 selects an image containing a subject that coincides with the image of person with a degree of coincidence more than a predetermined degree of coincidence out of the images sorted into that page by the image sorting section as an image to be fitted into the image frame.

It is noted that 'relatives' defined in image frames 1932 through 1935 is generic name of casting information indicating family members including Father, Mother, Brother and Sister. Then, the layout determining section 210 fits an image containing a person having either one of Father, Mother, Brother and Sister as casting information into the image frames appointed as 'relatives'.

Disposition and contents of texts presenting a title of the album and page titles are defined in the template in advance . For example, as the text of the album title, <Name>s' Story is defined in the template 1901. Still more, <Name>'s Family and Members are defined respectively to the templates 1903 and 1905.

It is noted that the text of the title defined by the template includes text replacement information indicating that at least a part of the text is to be replaced with field data contained in the specific subject information. For example, the text of the title defined in the templates 1901 and 1903 include text replacement information <Name> indicating that it is to be replaced with Name field. Then, the layout determining section 210 generates the text of each title by replacing part of the text indicated by the text replacement information <Name> by data of Name field specified by the specific subject information whose Casting field is Hero. Thereby, the album generating apparatus 100 can use the title appropriate to the specified hero. As described above, the album generating apparatus 100 can generate the album in which the images are disposed with the adequate layout corresponding to the subject information specified by the user 180.

Figure 20:
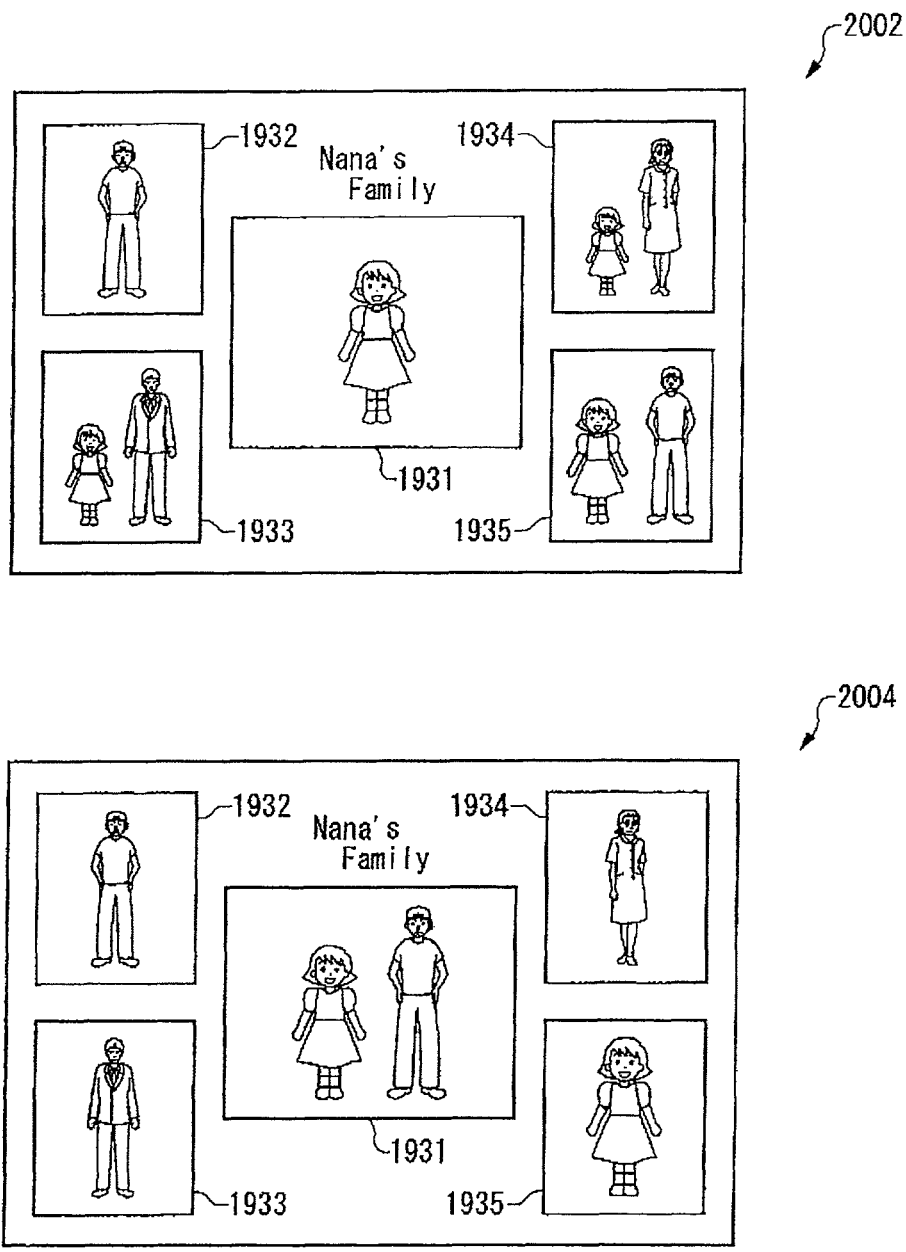
FIG. 20 shows exemplary layout results.

FIG. 20 shows exemplary layout results 2002 and 2004 laid out by the layout determining section 210. The layout determining section 210 fits the images into the image frames 1931 through 1945 defined by the template 1903. In the layout result 2002, the layout determining section 210 fits an image selected by the main image selecting section 212 as a main image and containing a person whose Casting field is Hero into the image frame 1931. The layout determining section 210 also fits images selected by the subsidiary image selecting section 222 as subsidiary images and containing persons whose Casting field is Family into the image frames 1932 through 1935.

It is noted that the layout determining section 210 may enlarge a trimmed image obtained by trimming the main image to fit it into the image frame 1931 of the main image so that an area of the hero (person whose Casting field is Hero) contained in the image frames 1931 through 1935 contained in the same page becomes larger than an area of persons (persons whose Casting field is some one other than the hero) other than the hero. Still more, the subsidiary image selecting section 222 may select subsidiary images to be fitted into the image frames 1932 through 1935 so that a number of heroes contained in the image frames 1931 through 1935 contained in the same page becomes larger than a number of persons other than the hero.

The layout result 2004 is one exemplary layout result when two heroes are specified. At this time, the main image selecting section 212 selects an image containing the two persons, i.e., the heroes, as a main image. Then, the layout determining section 210 fits the main image into the image frame 1931. At this time, the main image or the subsidiary image may be trimmed so that areas of the plurality of heroes become almost equal to fit into the image frames 1931 through 1935. As described above, the album generating apparatus 100 can dispose the images with adequate layout corresponding to the role of the subject by the specific subject information obtained by the specific subject information getting section 290.

FIG. 21 shows one exemplary composite information of images stored in the composite information storing section 216. The composite information is defined per page to define which images sorted by which sorting method are to be disposed to each page. For example, it is defined to store images sorted by a main subject to a first spread page (spread page No. 1) and a fifth spread page (spread page No. 5) in FIG. 21. Still more, it is defined to store images sorted by time to second through fourth spread pages (spread pages Nos. 2 through 5).

Because image capturing time when an image was captured becomes an important index in an album recording a child's growth for example, the composite information storing section 216 defines composite information indicating a page sorting method mainly based on time as the composite information. For example, the composite information storing section 216 defines composite information indicating so as to dispose the images sorted by time in the second through fourth spread pages. Then, the layout determining section 210 allocates the images sorted by the image capturing time sorting section 262 based on the distribution of times to each page in order of average time of the image capturing time of images sorted into each page. Thereby, the album generating apparatus 100 can generate the album having the spread pages in line with the child's growth.

The composite information storing section 216 also defines to dispose the images sorted by the main subject to the first spread page disposed right after the back and front cover pages. In this case, an image containing all persons appearing in the album is disposed in the first page of the contents of the album for example. Therefore, the appreciator can understand the whole persons appearing in the album in the first page of the album for example. Then, because the images sorted by image capturing time for example are disposed in the three spread pages thereafter, the appreciator can enjoy seeing how the hero has grown every time when the appreciator turns the page. Then, images sorted by the main subject, e.g., a plurality of images containing the whole family members, are disposed in the fifth spread page for example. Thus the composite information storing section 216 stores the composite information for sporadically inserting the spread pages sorted by the main subject while disposing the images sorted mainly in order of time in the spread pages. Thereby, the album generating apparatus 100 can prevent a monotonous album from being generated and can generate an album having an accent while having a story.

It is noted that the composite information storing section 216 may store appropriate composite information per type of an album, beside the growth recording album described above, such as a travel recording album, an event recording album and the like. For example, the composite information storing section 216 may store composite information for arranging images in the spread pages mainly based on the distribution of image capturing positions. As described above, the composite information storing section 216 defines the sorting method adequate to each spread page, so that the album generating apparatus 100 can allocate the images sorted by the adequate sorting method to each spread page in adequate order.

FIG. 22 shows one exemplary method of the characteristic color sampling section 226 in sampling a characteristic color. The characteristic color sampling section 226 calculates each color area, i.e., an area of color contained in each of a plurality of color ranges (color ranges A, B, C and so on) divided into predetermined color ranges in the main image selected by the main image selecting section 212. It is noted that in the main image selected by the main image selecting section 212, the characteristic color sampling section 226 may calculate a number of pixels contained in each of the plurality of color ranges as an index indicating the area.

Then, the characteristic color sampling section 226 calculates an area ratio, i.e., a ratio of the calculated color area to an area of the main image, for each of the plurality of color ranges. The characteristic color sampling section 226 also stores, in advance, an expected value of the area ratio indicating an area ratio expected to appear in an image for each of the plurality of color ranges. The expected value of the area ratio is an expected value per color range contained in an average image for example. For example, the characteristic color sampling section 226 may calculate the area ratio for each of the images stored in the image storing section 202 and to store an average value thereof as the expected value of the area ratio.

Then, the characteristic color sampling section 226 calculates a characteristic degree that is a ratio of the calculated area ratio to the expected value of the area ratio per color range to sample a color range where the ratio is maximized as a characteristic color in the main image. In the example of the figure, the characteristic color sampling section 226 calculates 1.25, 1.5 and 4 as the characteristic degree of the color ranges A, B and C. Thus, the characteristic color sampling section 226 samples the color range having an area ratio larger than the expected value as the characteristic color. Accordingly, the characteristic color sampling section 226 can adequately sample the characteristic color contained in the main image.

It is noted that the template coloring determining section 228 stores a plurality of color palettes showing a combination of colors visually harmonized for human. Then, the template coloring determining section 228 selects the color palette containing the characteristic color sampled by the characteristic color sampling section 226 to arrange color in the template by using the color contained in the selected color palette. For example, the template coloring determining section 228 determines colors used for characters of titles contained in the templates 1901, 1903 and 1905, background colors of each page and colors of the image frame defined by the template. Thereby, the album generating apparatus 100 can generate the page well harmonized and adequately colored containing the color close to the characteristic color of the main image.

Figure 23:
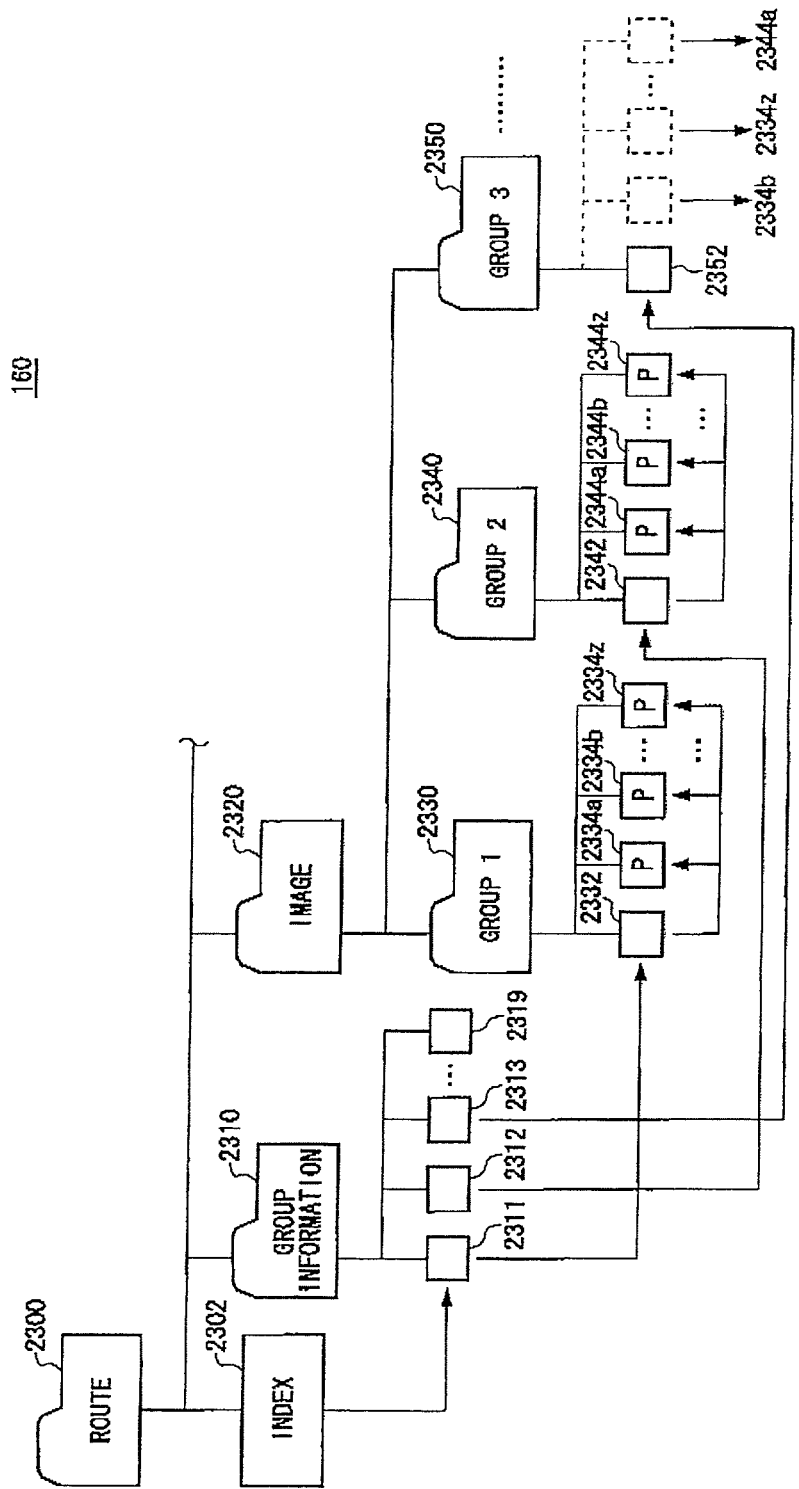
FIG. 23 is a diagram showing one exemplary directory configuration of an album information file recorded in a recording medium.

FIG. 23 is a diagram showing one exemplary directory configuration of an album information file recorded by the album generating apparatus 100 in the recording medium 160. The album information recording section 270 stores an index file 2302, a group information directory 2310 in which group information files 2311 through 2319 describing group information and an image directory 2320 right under a route directory 2300. The album information recording section 270 also stores group image directories 2330, 2340, 2350 and so on storing the images sorted by the image sorting section 240 per page right under the image directory 2320. The album information recording section 270 also stores group information files 2332, 2342 and 2352 right under the group image directories 2330, 2340 and 2350.

The album information recording section 270 stores images 2334a through 2334z sorted respectively by the image capturing time sorting section 262 and the group index file 2332 as well as images 2344a through 2344z and the group image information file 2342 under the group image directories 2330 and 2340. Then, the album information recording section 270 stores a group image information file 2352 and images sorted by the main subject sorting section 266 right under the group image directory 2350. Here, the album information recording section 270 stores not the image file itself but link information indicating a link to images stored in the other group image directory right under the group image directory 2350. This link information may be described in the group image information file 2352 or may be recorded by a symbolic link and the like to the images stored in the other group image directory. Therefore, the image itself will not be recorded while overlapping from each other when the images are sorted by different sorting methods. Accordingly, the album generating apparatus 100 can store the images efficiently in the recording medium 160.

It is noted that the group image information files 2332, 2342 and 2352 describe layout information by which each of the images stored in the directory of the same level is outputted. For example, the group image information files 2332, 2342 and 2352 describe printing layout information such as position and size of images printed in a spread page of the album as well as color and the like of the template to be printed. The group image information files 2332, 2342 and 2352 also describe display layout information such as position, size order of images displayed in a same display area in an electronic album as well as color and the like of the template.

The group information files 2311, 2312 and 2313 describe information specifying the group image information files 2332, 2342 and 2352, e.g., filenames of the group image information files 2332, 2342 and 2352. The index file 2302 describes information specifying the group information files 2311 through 2319, e.g., file names of the group information files 2311 through 2319. The index file 2302 also defines order for outputting the images managed by the group image information files 2332, 2342 and 2352 corresponding to the group information files 2311, 2312 and 2313. For example, the index file 2302 describes a page ID for identifying a spread page in which the images managed by the group image information files 2332, 2342 and 2352 are printed in the album. Still more, the index file 2302 describes a sequence ID for identifying order for displaying images managed by the group image information files 2332, 2342 and 2352 corresponding to the group information files 2311, 2312 and 2313 in the album.

Accordingly, the album generating apparatus 100 specifies the file name in the group information files 2311 through 2319 by reading the index file 2302 described in the recording medium 160. Then, the album generating apparatus 100 specifies the file name of the group image information files 2332, 2342, 2352 and so on by reading the group information files 2311 through 2319. Further, the album generating apparatus 100 can output the images as the album by reading the group image information files 2332, 2342 and 2352.

It is noted that the index file 2302, group information files 2311 through 2319 and the group image information files 2332, 2342 and 2352 may be described in XML format. For example, the index file 2302 describes the file names representing the group information files 2311 through 2319 as tag data for the tag name for identifying each group. As described above, the album generating apparatus 100 can determine a displaying mode of the grouped images by reading the index recorded in the route directory 2300. Accordingly, the album generating apparatus 100 can record the images and the displaying mode of the images in the album in the recording medium 160 with the flexible directory configuration.

Figure 24:
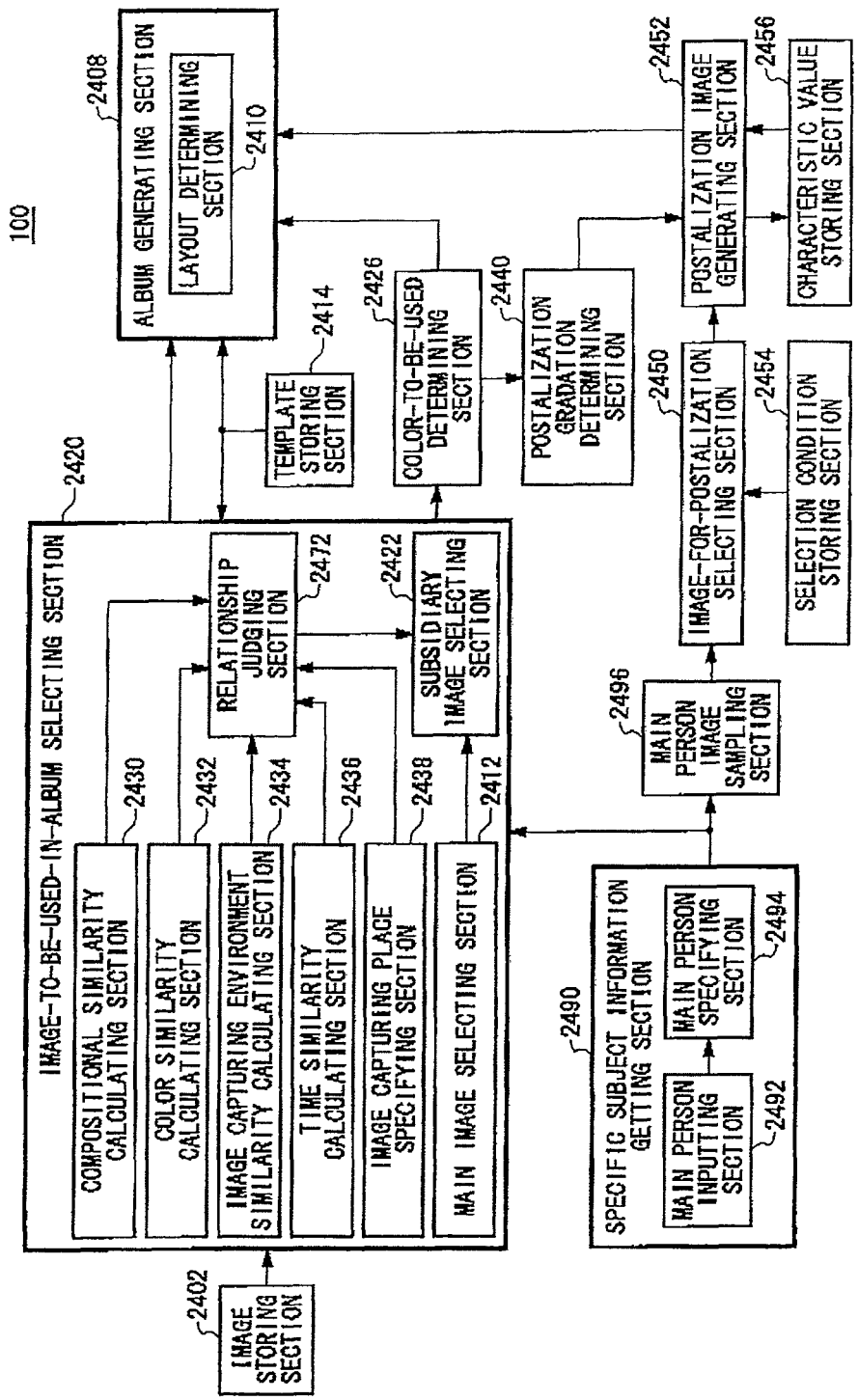
FIG. 24 is a block diagram showing one exemplary block configuration of another embodiment of the album generating apparatus.

FIG. 24 is a block diagram showing one exemplary block configuration of the album generating apparatus 100 according to another embodiment. The album generating apparatus 100 of the present embodiment provides an album generating apparatus for generating an album having an adequate and uniform layout. An environment for using the album generating apparatus 100 of the present embodiment is the same with the environment for using the album generating apparatus 100 explained in connection with FIG. 1, so that its explanation will be omitted here. Specifically, the album generating apparatus 100 provides the user 180 with an album having a sense of uniformity by disposing a postalization image to each page of the album or by disposing images of related scenes to each page.

The album generating apparatus 100 has an image storing section 2402, an album generating section 2408, a template storing section 2414, a color-to-be-used determining section 2426, an image-to-be-used-in-album selecting section 2420, an postalization image selecting section2450, a postalization image generating section 2452, a selection condition storing section 2454, a characteristic value storing section 2456 and a specific subject information getting section 2490. The image-to-be-used-in-album selecting section 2420 has a main image selecting section 2412, a subsidiary image selecting section 2422, a compositional similarity calculating section 2430, a color similarity calculating section 2432, an image capturing environment similarity calculating section 2434, a time similarity calculating section 2436, an image capturing place specifying section 2438 and a relationship judging section 2472. The specific subject information getting section 2490 has a main person inputting section 2492 and a main person specifying section 2494.

The image storing section 2402 stores a plurality of images. The specific subject information getting section 2490 obtains an image of a main person in the album. The main person inputting section 2492 requests one to input an image containing the main person in the album and position of the main person in the image out of the plurality of images stored in the image storing section 2402. The main person specifying section 2494 specifies the image of the main person in the album out of the plurality of images stored in the image storing section 2402. Specifically, the main person specifying section 2494 specifies the image of the main person from the image containing the main person and the position thereof inputted through the main person inputting section 2492. It is noted that the specific operation and function of the main person inputting section 2492 and the main person specifying section 2494 are almost same with those of the main person inputting section 292 and the main person specifying section 294, so that their explanation will be omitted here.

The main person image sampling section 2496 samples a plurality of images of the main person, i.e., subject images of the main person, out of the subject images contained in the plurality of images stored in the image storing section 2402 by comparing the image of the main person specified by the main person specifying section 2494 with the subject images contained in the plurality of images stored in the image storing section 2402. Then, the postalization image selecting section 2450 selects an image suitable for a postalization process out of the plurality of images of the main person sampled by the main person image sampling section 2496. The postalization image generating section 2452 applies the postalization process to the image selected by the postalization image selecting section 2450 to generate a postalization image to be used in the album. Then, the album generating section 2408 generates the album containing the image of the main person by using the postalization image generated by the postalization image generating section 2452.

The selection condition storing section 2454 stores selecting conditions for selecting the image suitable for postalization. Specifically, the selection condition storing section 2454 stores the selecting conditions presenting an extent of a distribution of luminance suitable for the postalization image. Then, the postalization image selecting section 2450 selects a postalization image that agrees with the selecting condition stored in the selection condition storing section 2454. Specifically, the postalization image selecting section 2450 selects an image having an extent of distribution of luminance that conforms to the extent of the distribution of luminance stored in the selection condition storing section 2454.

The postalization gradation determining section 2440 determines gradation of the postalization process. It is noted that the selection condition storing section 2454 stores the selecting conditions per gradation of postalization. Then, the postalization image selecting section 2450 selects a postalization image that conforms to the selecting condition stored in the selection condition storing section 2454 by correlating with the gradation of the postalization image determined by the postalization gradation determining section 2440. The postalization image generating section 2452 generates the postalization image to be used in the album by applying the postalization with the gradation determined by the postalization gradation determining section 2440 to the image selected by the postalization image selecting section 2450.

The color-to-be-used determining section 2426 determines each character color to be used for characters defined in the template of each page of the album. Then, the postalization image generating section 2452 generates a postalization image of the character color determined by the color-to-be-used determining section 2426 by applying the postalization process to the image selected by the postalization image selecting section 2450. It is noted that when there is a more number of colors used for the characters determined by the color-to-be-used determining section 2426, the postalization gradation determining section 2440 may determine the gradation of the postalization process to be large. The album generating section 2408 generates an album containing a page laid out so that the postalization image generated by the postalization image generating section 2452 adjoins to the characters for which the character color determined by the color-to-be-used determining section 2426 in each page. Thereby, the postalization image having a sense of uniformity with the title characters of each page may be generated.

It is noted that the image-to-be-used-in-album selecting section 2420 may select the plurality of images to be used for the album out of the plurality of images stored in the image storing section 2402. Then, the main person image sampling section 2496 samples the plurality of images of the main person, i.e., the subject images of the main person, out of the subject images contained in the plurality of images selected by the image-to-be-used-in-album selecting section 2420. The postalization image selecting section 2450 selects the image suitable for postalization out of the plurality of images of the main person sampled by the main person image sampling section 2496.

The characteristic value storing section 2456 stores a characteristic value of the postalization image used in the album generated by the album generating section 2408 and the postalization image generating section 2452 generates a postalization image having a characteristic value different from any one of characteristic values of the postalization images stored in the characteristic value storing section 2456 when the album generating section 2408 generates a new album. Then, the album generating section 2408 generates the new album by using the postalization images generated by the postalization image generating section 2452.

It is noted that the album generating section 2408 disposes one postalization image generated by the postalization image generating section 2452 to a plurality of pages of the album. Specifically, the album generating section 2408 disposes one postalization image generated by the postalization image generating section 2452 to the front and back cover pages of the album as well as to predetermined position of the pages composing the album. Therefore, the postalization image used in each album becomes unique per album. Therefore, since the albums may be identified by the postalization image, the postalization image may be used for schedule control in dealing with re-ordering of the albums and in the production of the albums.

The main image selecting section 2412 selects the main image that is t be the primary image in the album out of the plurality of images stored in the image storing section 2402. The relationship judging section 2472 judges the relationship between the main image selected by the main image selecting section 2412 and the plurality of images stored in the image storing section 2402 based on the contents of the plurality of images stored in the image storing section 2402. Then, the subsidiary image selecting section 2422 selects the image judged by the relationship judging section 2472 that it is highly related with the main image selected by the main image selecting section 2412 as a subsidiary image that is to be subsidiary to the main image selected by the main image selecting section 2412 in the album out of the plurality of images stored in the image storing section 2402. Then, the layout determining section 2410 lays out the main image selected by the main image selecting section 2412 and the subsidiary image selected by the subsidiary image selecting section 2422 in the same page in the album based on the contents of the main image selected by the main image selecting section 2412 and the subsidiary image selected by the subsidiary image selecting section 2422.

The template storing section 2414 stores a judging condition of highly judging the relationship of the main image with an image whose image capturing time is closer to image capturing time of the main image. Then, the relationship judging section 2472 highly judges the relationship of the main image with the image whose image capturing time is closer to that of the main image.

The template storing section 2414 stores a judging condition of highly judging the relationship of the main image with an image whose composition is more similar to the main image. The compositional similarity calculating section 2430 calculates a degree of similarity of compositions of the images based on composition of subject contained in the plurality of images stored in the image storing section 2402. Then, the relationship judging section 2472 may highly judge the relationship of the main image with the image whose composition is calculated to be highly similar to that of the main image by the compositional similarity calculating section 2430.

The template storing section 2414 also stores a judging condition of highly judging the relationship of the main image with an image containing a color that is more similar to that of the main image. The color similarity calculating section 2432 judges the degree of similarity of the colors of the images based on a distribution of colors contained in the plurality of images stored in the image storing section 2402. Then, the relationship judging section 2472 highly judges the relationship of the main image with the image whose color was calculated to be more similar to that of the main image.

The template storing section 2414 stores a judging condition of highly judging the relationship of the main image with an image whose image capturing environment is similar to that of the main image. The image capturing environment similarity calculating section 2434 calculates the similarity of image capturing environments in which the plurality of images stored in the image storing section 2402 were captured. Then, the relationship judging section 2472 highly judges the relationship of the main image with an image whose image capturing environment was judged by the image capturing environment similarity calculating section 2434 to be highly similar to that of the main image.

The template storing section 2414 stores a judging condition of highly judging the relationship of the main image with an image whose image capturing place is similar to that of the main image. The image capturing place specifying section 2438 specifies whether the place where the plurality of images stored in the image storing section 2402 was captured was indoor or outdoor based on the contents of the images stored in the image storing section 2402. Then, the relationship judging section 2472 highly calculates the relationship of the main image with an image whose image capturing place was specified to be same with that of the main image by the image capturing place specifying section 2438 more than the relationship of the main image with an image whose image capturing place was specified to be different from that of the main image by the image capturing place specifying section 2438.

The template storing section 2414 stores a judging condition of highly judging the relationship of the main image with an image whose image capturing time is close to that of the main image. The image capturing time here is a concept representing timing when the image was captured, such as a season, a month and time in a day. The time similarity calculating section 2436 judges closeness of the image capturing times of the plurality of images stored in the image storing section 2402. Then, the relationship judging section 2472 highly judges the relationship of the main image with the image whose image capturing time was calculated by the time similarity calculating section 2436 to be closer to that of the main image.

Thus, the template storing section 2414 stores the judging conditions of judging the degree of relationship between the main image and the subsidiary image. Then, based on the judging conditions stored in the template storing section 2414, the relationship judging section 2472 judges the degree of relationship between the main image and the plurality of images stored in the image storing section 2402. Thus, the album generating apparatus 100 can generate the album having a sense of uniformity throughout the album because it disposes the same postalization image in each page of the album. Still more, because the album generating apparatus 100 uses the image of the hero after undergoing through the postalization process, it can generate the unique album in accordance to intention of the user 180. Still more, because the album generating apparatus 100 selects the subsidiary image related with the main image, the appreciator may feel a sense of uniformity in terms of contents in each page.

Figure 25:
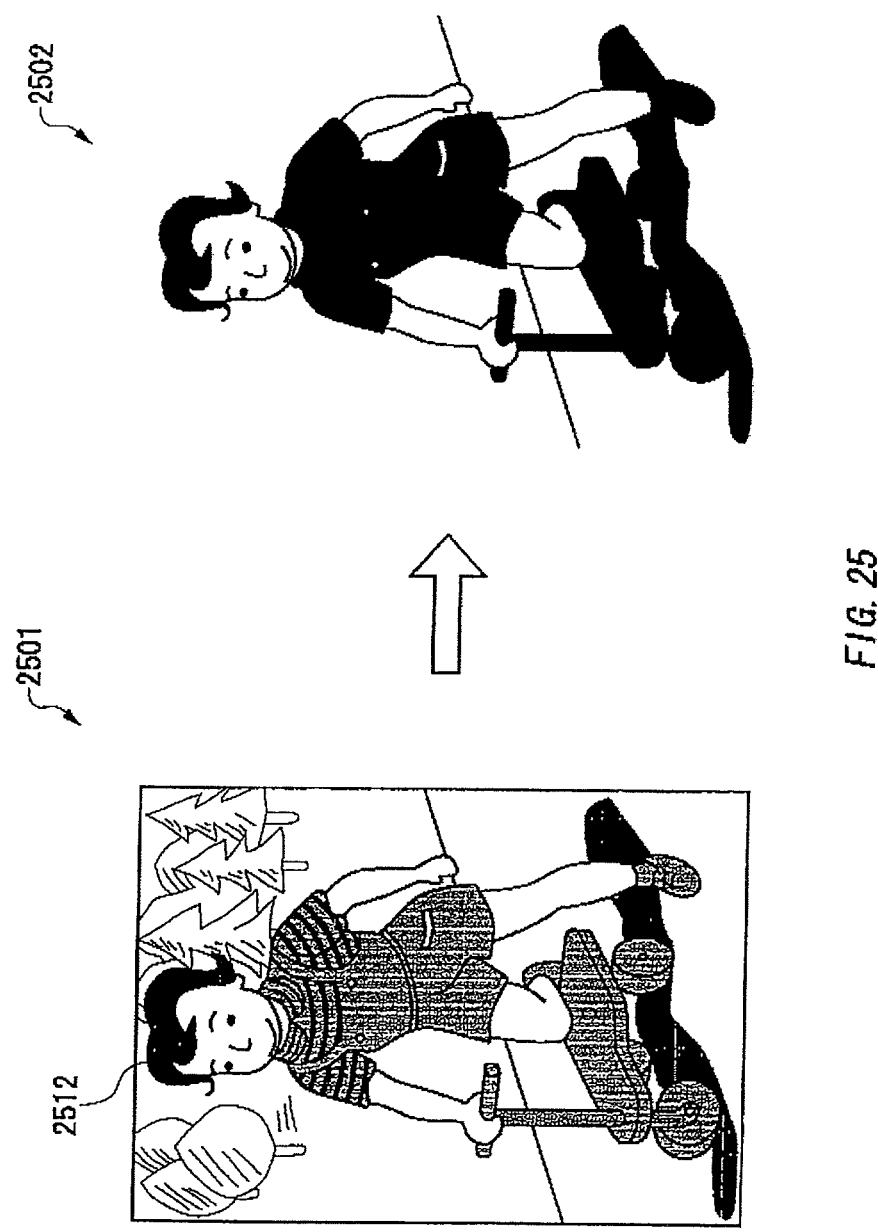
FIG. 25 is a drawing showing one exemplary postalization image.

FIG. 25 is a drawing showing one exemplary postalization image. The postalization image generating section 2452 generates a postalization image 2514 by applying the postalization process to an image 2512 of a hero contained in an image 2502. The postalization image may be an image in which a pixel value of the image is limited to a discrete value and it may be an image in which a regional image of the hero is binalized or three-valued. It is noted that the postalization image may not be limited to the image in which the regional image of the hero is binalized or three-valued but may be an image to which the postalization process is applied to a degree recognizable to be different from the image.

Figure 26:
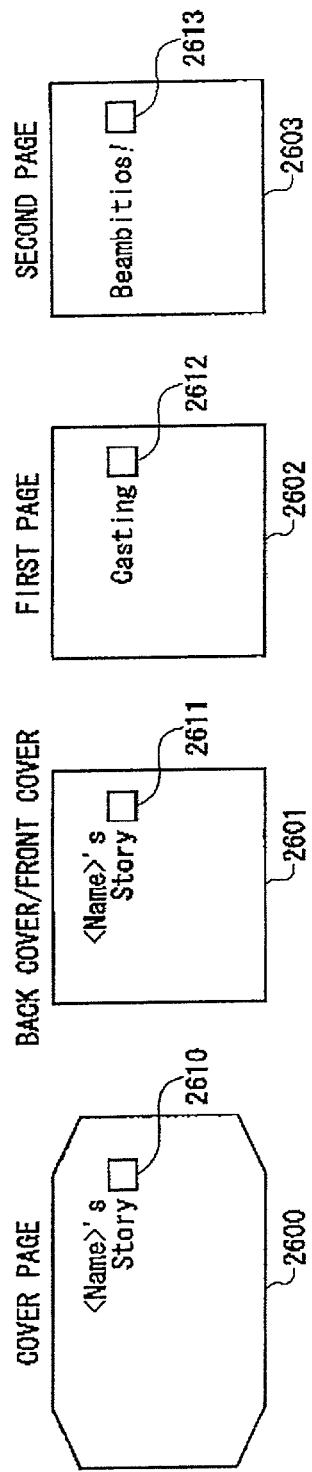
FIG. 26 shows one exemplary disposition of the postalization image.

FIG. 26 shows one exemplary disposition of the postalization image defined by the template storing section 2414. The template storing section 2414 describes that the postalization image is disposed so as to adjoin with the page title for impressing the album title of the front and back covers composing the album and the theme of the page composing the album to the appreciator of the album as postalization image disposition information. For example, postalization image disposition information 2610 of a cover page 2600 of the album defines so as to lay out a postalization image having an almost same height with that of the album title at the position adjoining to the album title at the upper part of the cover face overlapped with the front cover. Similarly to that, postalization image disposition information 2611 of the template 2601 of the back and front covers defines so as to lay out a postalization image at almost same height with the album title so as to adjoin to the album title at the upper part of a face that becomes a front cover of the album. Still more, postalization image disposition information 2612 and 2613 of templates 2602 and 2603 of first and second pages composing the contents of the album define so as to lay out a postalization image at almost same height with the height of the album title at the position adjoining to page titles (Casting, Be ambitious!) at the upper right part of the page region of a spread page.

Then, the album generating section 2408 disposes the postalization image at position and size corresponding to the position of the postalzation image disposition information 2610 through 2613 defined by the template storing section 2414. It is noted that the postalization image disposition information 2610 through 2613 may define so as to dispose the postalization image having a same width with a height of text such as the adjoining album title and page title. The postalization image disposition information 2610 through 2613 also define so as to use the same color with the color used for the text such as each title determined by the color-to-be-used determining section 2426. The postalization image disposition information 2610 through 2613 may also define so as to use a postalization image having gradation corresponding to the gradation of text such as each title determined by the color-to-be-used determining section 2426. Still more, the postalization image disposition information 2610 through 2613 may define so as to use a postalization image having gradation corresponding to a number of colors of the text such as each title determined by the color-to-be-used determining section 2426. The postalization image generating section 2452 may generate the postalization image having the color and gradation defined by the postalization image disposition information.

As described above, since the album generating apparatus 100 disposes the same postalization image adjoining to each title of the album, it can provide the user 180 with the album having a sense of uniformity as a whole. It is noted that desirably, the image of the hero generating the postalization image is selected out of the images used in the album. The appreciator can pleasantly appreciate the album generated by the album generating apparatus 100 by selecting it out of the images used in the album.

Figure 27:
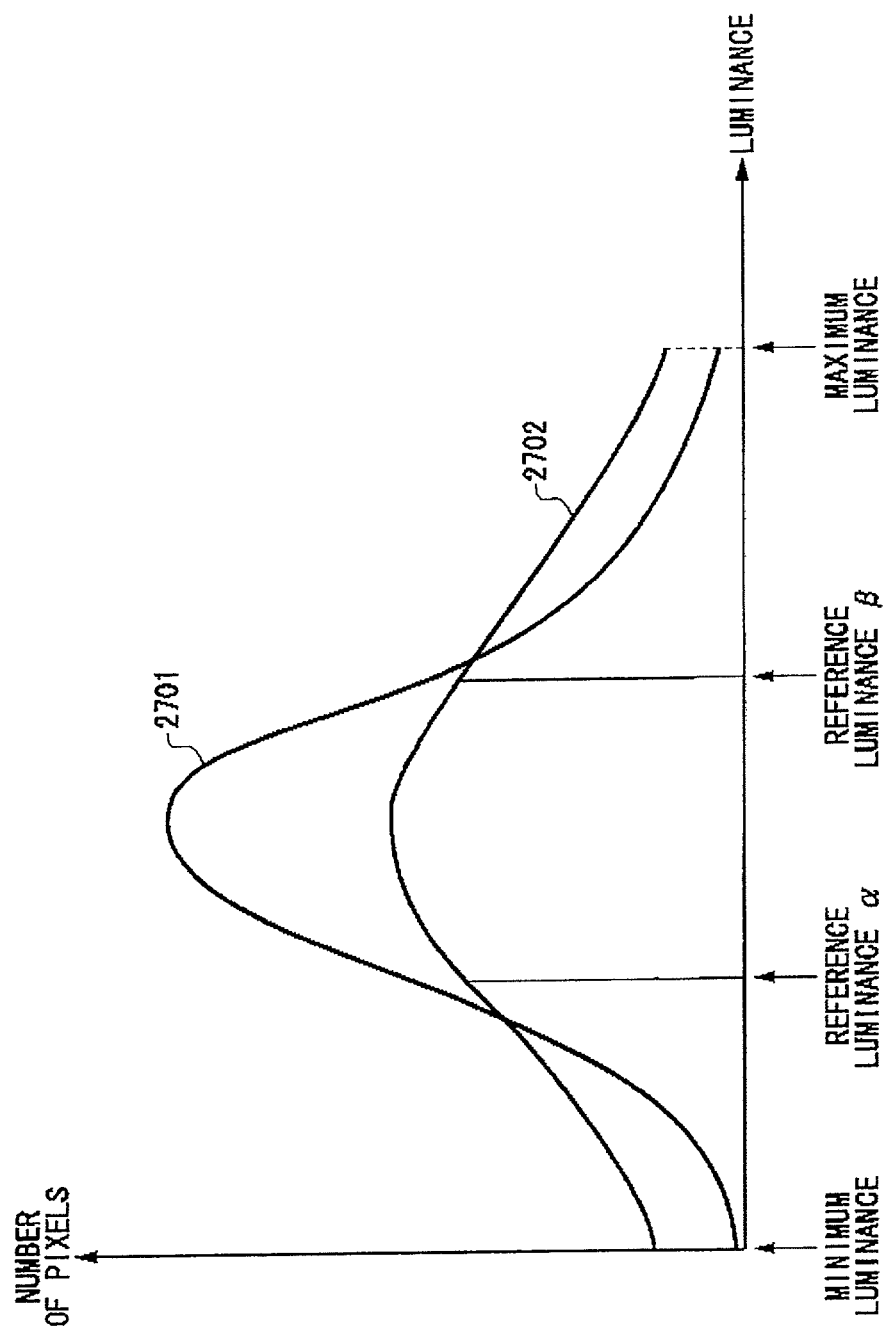
FIG. 27 is a graph showing one exemplary distribution of luminance of images.

FIG. 27 is a graph showing one exemplary distribution of luminance of images. The postalization image selecting section 2450 calculates a luminous distribution of the image of the main person sampled by the main person image sampling section 2496. Luminous distributions 2701 and 2702 are exemplary luminous distributions calculated by the postalization image selecting section 2450 from different images of the main person sampled by the main person image sampling section 2496.

Then, the postalization image selecting section 2450 calculates a divergent index $B_\alpha$ that is a rate of a number of pixels having a luminous value less than a reference luminance $\alpha$ set in advance to a whole number of pixels and a divergent index $B_\beta$ that is a rate of a number of pixels having a luminous value less than a reference luminance $\beta$ set in advance to a whole number of pixels. Then, the postalization image selecting section 2450 selects an image whose divergent indices $B_\alpha$ and $B_\beta$ are larger than the reference value as an image for generating a postalization image. It is noted that the selection condition storing section 2454 may store the reference luminance $\alpha$ and $\beta$ as well as minimum values $B_{\alpha min}$ and $B_{\beta min}$ of the divergent indices $B_\alpha$ and $B_\beta$ corresponding to the reference luminance $\alpha$ and $\beta$. Then, the postalization image selecting section 2450 calculates the divergent indices $B_\alpha$ and $B_\beta$ based on the reference luminance $\alpha$ and $\beta$ stored in the selection condition storing section 2454 and the image of the main person selected by the main person image sampling section 2496. The postalization image selecting section 2450 then selects an image whose calculated divergent indices $B_\alpha$ and $B_\beta$ is larger than the reference value of the divergent indices $B_{60}$ and $B_\beta$ stored in the selection condition storing section 2454 as an image suitable for generating a postalization image. It is noted that the postalization image selecting section 2450 may preferentially select an image whose divergent indices $B_\alpha$ and $B_\beta$ are largest among the images of the main person selected by the main person image sampling section 2496 and whose divergent indices $B_\alpha$ and $B_\beta$ are larger than the reference values $B_{\alpha min}$ and $B_{\beta min}$ set in advance as an image suitable for the postalization image.

As described above, the postalization image selecting section 2450 can select the image of the main person whose contrast is clear as an image to which the postalization process is applied. For example, the postalization image selecting section 2450 judges that an image of the luminous distribution 2702 is suitable for the postalization image more than an image of the luminous distribution 2701 in the case of the figure. Accordingly, it is possible to prevent a most area of the postalization image generated by the postalization process from being whited out or from being blacked out in advance. It is noted that beside the combinations of reference luminance $\alpha$ and $\beta$ and the divergent indices $B_{\alpha min}$ and $B_{\beta min}$, the selection condition storing section 2454 may store a condition of selecting an image containing a face of a person as an image suitable for a postalization image more than an image containing no face of a person. At this time, the selection condition storing section 2454 may store a condition of selecting an image containing a face of a person seen more from the front side as an image suitable as a postalization image. Thereby, the postalization image generating section 2452 can generate a postalization image copying features of a hero such that the appreciator can recognize the hero by connecting with the postalization image.

It is noted that the selection condition storing section 2454 may store reference luminance and divergent index corresponding to gradation in which the postalization image generating section 2452 carries out the postalization process. Although the selection condition storing section 2454 stores the condition that the binary postalization process is based on a number of pixels contained in the two regions of minimum luminance to reference luminance $\alpha$ and reference luminance $\beta$ to maximum luminance in the case described above, it stores a condition that the three-valued postalization process is based on a number of pixels contained in three regions of minimum luminance to reference luminance $\alpha$, reference luminance $\gamma$ to reference luminance $\eta$ and reference luminance $\beta$ to maximum luminance for example. Thereby, the selection condition storing section 2454 can provide the postalization image selecting section 2450 with the adequate selecting condition corresponding to various gradations such as three-valued process.

FIG. 28 is a table showing exemplary characteristic values of the postalization image stored in the characteristic value storing section 2456. The characteristic value storing section 2456 stores pattern information and color information of postalization images by correlating with postalization image IDs for identifying a postalization image generated by the postalization image generating section 2452. For example, when the postalization process is binary, the characteristic value storing section 2456 stores position of a pixel whose luminance is maximum luminance, e.g., 1, or minimum luminance, e.g., 0, as pattern information. Beside that, the characteristic value storing section 2456 may store information of the position of the pixel having the maximum or minimum luminance coded corresponding to the position of the pixel as pattern information. The characteristic value storing section 2456 also stores values of color information, e.g., each component of R, G and B, in the pixel whose luminance is maximum luminance for example.

Thus, the characteristic value storing section 2456 stores the characteristic values of the postalization image already generated by the postalization image generating section 2452. Then, when the postalization image generating section 2452 generates a postalization image anew, it generates the postalization image having different characteristic values from the characteristic values stored in the characteristic value storing section 2456. Therefore, the album generating apparatus 100 can generate the new postalization image having the different characteristic values from the postalization image already generated and use in an album generated anew. Accordingly, the album generating apparatus 100 can provide the user 180 with own postalization image. Still more, the user 180 can use the postalization image in renewing an order. For example, a photo shop can readily specify an album whose order is to be renewed when the user 180 brings the album to the photo shop or transmits an image of the postalization image to the photo shop by a portable phone or the like. The postalization image may be also used for production control as an identification mark of each album by printing the postalization image in the cover, in the back cover and front cover pages and in the page of the contents of the album as explained in connection with FIG. 26. It is noted that the postalization image generating section 2452 may generate the postalization image as two-dimensional code such as QR code.

Figure 29:
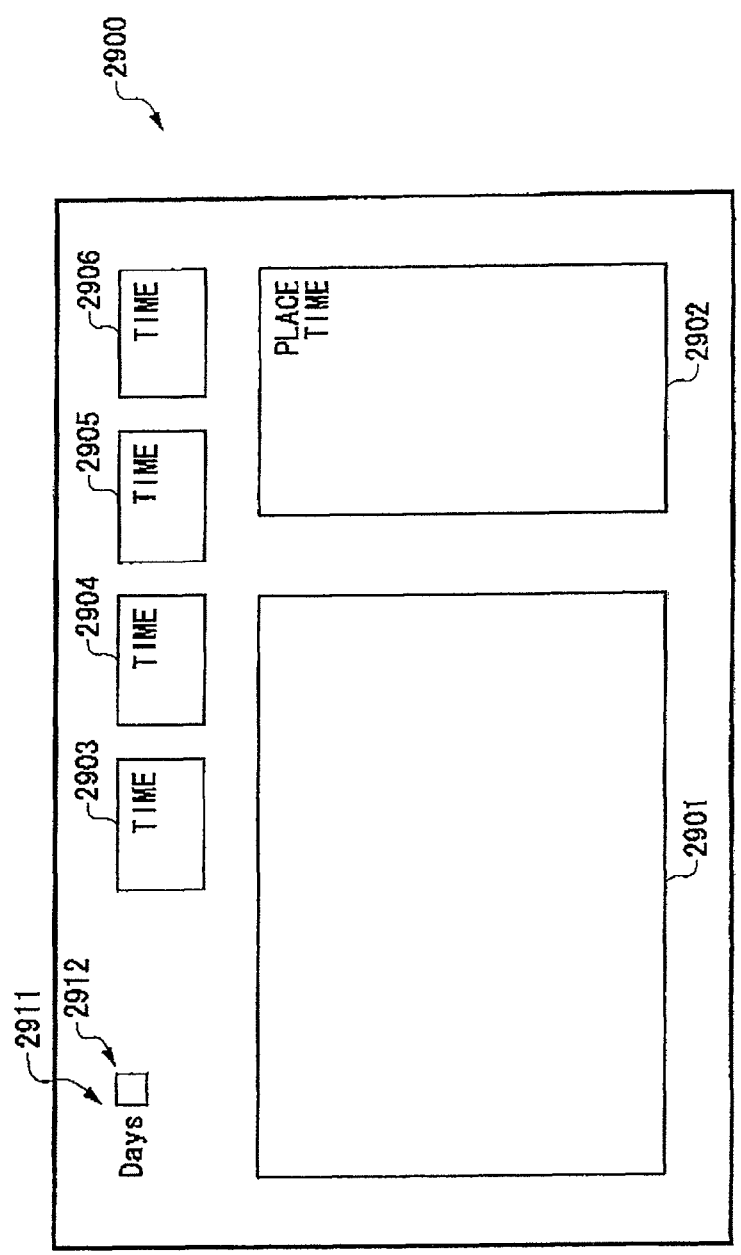
FIG. 29 shows one exemplary judging condition stored in a template storing section.

FIG. 29 shows one exemplary judging condition stored in the template storing section 2414. A template 2900 of one spread page contains page title information 2911 defining position, size and contents of the page title, postalization image disposition information 2912 where a postalization image is disposed, an image frame 2901 defining so that a main image is fitted into it and image frames 2902 through 2906 defining so that subsidiary images are fitted into them. In this case, the layout determining section 2410 determines to fit the main image selected by the main image selecting section 2412 to the image frame 2901.

It is also defined so as to fit an image captured at the same image capturing place with that of the image fitted into the image frame 2901 for the main image into the image frame 2902 based on the judging condition of the image capturing place. It is also defined so as to fit images captured at almost same image capturing time with the image fitted into the image frame 2901 for the main image into the image frames 2903, 2904, 2905 and 2906 defined by the template based on the judging condition of the image capturing time. Thus, the template storing section 2414 stores the judging conditions for judging the relationship of the image to be fitted into the image frame of the subsidiary image with the main image.

Therefore, the subsidiary image selecting section 2422 can select a subsidiary image having a relationship that conforms to the condition for judging the relationship with the main image defined in the template. For example, images of scenes temporarily continuous with the time when the main image was captured may be disposed in the image frames 2903 through 2906 and an image of a scene positionally and temporarily continuous with the main image may be disposed in the image frame 2902. Therefore, the album generating apparatus 100 can prevent images having totally no relationship with the main image from being disposed. It is noted that the template storing section 2414 stores the page title 2911 conforming to the relational condition. As described above, the album generating apparatus 100 can dispose the images containing scenes related to each other in the same spread page. Therefore, the album generating apparatus 100 enables the images to conform to an image disposing image.

Figure 30:
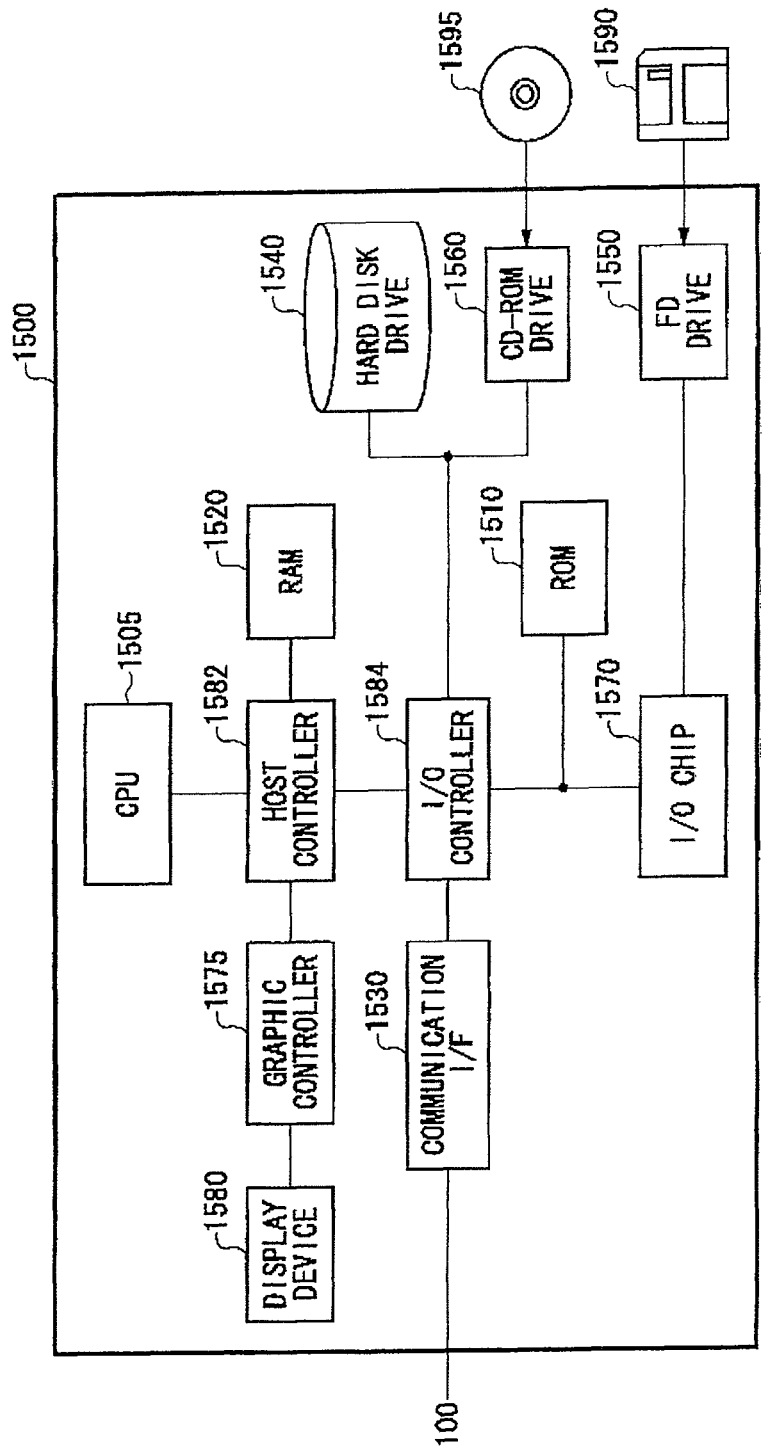
FIG. 30 is a block diagram showing one exemplary hardware configuration of a computer of the album generating apparatus.

FIG. 30 is a block diagram showing one exemplary hardware configuration of a computer 1500 of the album generating apparatus 100. The computer 1500 of the present embodiment has a CPU peripheral section having a CPU 1505, a RAM 1520, a graphic controller 1575 and a display device 1580 mutually connected by a host controller 1582, an input/output section having a communication interface 1530, a hard disk drive 1540 and a CD-ROM drive 1560 connected with the host controller 1582 via an input/output controller 1584 and a legacy input/output section having a ROM 1510, a flexible disk drive 1550 and an input/output chip 1570 connected with the input/output controller 1584.

The host controller 1582 connects the RAM 1520, the CPU 1505 that accesses the RAM 1520 at high transfer rate and the graphic controller 1575. The CPU 1505 operates based on programs stored in the ROM 1510 and the RAM 1520 to control the respective sections. The graphic controller 1575 obtains image data generated by the CPU 1505 and others on a frame buffer provided within the RAM 1520 to display on the display device 1580. Instead of that, the graphic controller 1575 may contain the frame buffer for storing the image data generated by the CPU 1505 and others.

The input/output controller 1584 connects the host controller 1582 with the communication interface 1530, which is a relatively fast input/output device, the hard disk drive 1540 and the CD-ROM drive 1560. The hard disk drive 1540 stores programs and data used by the CPU 1505 within the computer 1500. The communication interface 1530 communicates with the album generating apparatus 100 via network to provide programs or data to the album generating apparatus 100. The CD-ROM drive 1560 reads the program or data out of the CD-ROM 1595 and provides it to the hard disk drive 1540 and to the communication interface 1530 via the RAM 1520.

The input/output controller 1584 is connected with the relatively slow input/output devices of the ROM 1510, the flexible disk drive 1550 and the input/output chip 1570. The ROM 1510 stores a boot program executed by the computer 1500 in starting the system and programs and the like dependent on the hardware of the computer 1500. The flexible disk drive 1550 reads a program or data out of a flexible disk 1590 and provides it to the hard disk drive 1540 and to the communication interface 1530 via the RAM 1520. The input/output chip 1570 connects the flexible disk drive 1550 and the various input/output devices via parallel ports, serial ports, keyboard ports, mouse ports and the like.

The program provided to the communication interface 1530 via the RAM 1520 is stored in the flexible disk 1590, the CD-ROM 1595 or the recording medium such as an IC card to be provided to the user. The program is read out of the recording medium to be provided to the communication interface 1530 via the RAM 1520 and to be transmitted to the album generating apparatus 100 via the network. The program transmitted to the album generating apparatus 100 is installed in and executed by the album generating apparatus 100.

The program installed to and executed by the album generating apparatus 100 operates the album generating apparatus 100 so as to function as the image storing section 202, the object sampling section 206, the number-of-object-image calculating section 208, the layout determining section 210, the main image selecting section 212, the subsidiary image selecting section 222, the trimming section 224, the person recognizing section 230, the momentum calculating section 232, the area-to-contour ratio calculating section 234, the image sorting section 240, the similarity calculating section 242, the distribution-of-image capturing time calculating section 252, the distribution-of-image capturing position calculating section 254, the importance judging section 260, the relationship judging section 272, the distance calculating section 274, the specific subject information getting section 290, the image-of-main person selecting section 296, the characteristic color sampling section 226, the template coloring determining section 228, the template storing section 214, the composite information storing section 216, the light source specifying section 256, the compositional similarity calculating section 258 and the album information recording section 270 explained in connection with FIGS. 1 through 23. The program installed to and executed by the album generating apparatus 100 operates the image sorting section 240 so as to function as the image capturing time sorting section 262 and the image capturing position sorting section 264 and operates the layout determining section 210 so as to function as the disposition determining section 282 and the size determining section 284. Still more, the program installed to and executed by the album generating apparatus 100 causes the specific subject information getting section 290 to function as the main person inputting section 292 and the main person specifying section 294. The program installed to and executed by the album generating apparatus 100 explained in connection with FIGS. 22 through 29 operates the album generating apparatus 100 so as to function as the image storing section 2402, the album generating section 2408, the template storing section 2414, the color-to-be-used determining section 2426, the image-to-be-used-in-album selecting section 2420, the postalization image selecting section 2450, the postalization image generating section 2452, the selection condition storing section 2454, the characteristic value storing section 2456 and the specific subject information getting section 2490 explained in connection with FIGS. 22 through 29. Still more, the program operates the image-to-be-used-in-album selectingsection2420 so as to functional the main image selecting section 2412, the subsidiary image selecting section 2422, the compositional similarity calculating section 2430, the color similarity calculating section 2432, the image capturing environment similarity calculating section 2434, the time similarity calculating section 2436, the image capturing place specifying section 2438 and the relationship judging section 2472 explained in connection with FIGS. 22 through 29 and causes the specific subject information getting section 2490 to function as the main person inputting section 2492 and the main person specifying section 2494 explained in connection with FIGS. 22 through 29.

The program described above may be stored in an external storage medium. As the storage medium, an optical recording medium such as DVD and PD, a magneto-optic recording medium such as MD, a tape medium and a semiconductor memory such as IC card may be used beside the flexible disk 1590 and the CD-ROM 1595. Still more, a storage device such as a hard disk and RAM provided in a server system connected with a dedicated communication network and Internet may be used as the recording medium and the program may be provided to the communication line 1500 via the network.

Although the invention has been described by way of the exemplary embodiments, it should be understood that those skilled in the art might make many changes and substitutions without departing from the spirit and scope of the invention. It is obvious from the definition of the appended claims that the embodiments with such modifications also belong to the scope of the invention.

What is claimed is:

1. A processor based album generating apparatus, comprising:
    an image storing section for storing images by correlating with image capturing time and image capturing position of the images, the image capturing time being the time at which the image was captured, the image capturing position being the location at which the image was captured;
    an importance judging section for judging importance of the image capturing time and image capturing position in the plurality of images stored in said image storing section and judging whether the importance of the image capturing time is greater than that of the image capturing position;
    an image capturing time sorting section for sorting the plurality of images stored in said image storing section per page in the album based on the image capturing time stored in said image storing section when the importance judging section judges that the importance of the image capturing time is greater than that of the image capturing position;
    a layout determining section for laying out the images sorted per page by said image capturing time sorting section to each page of the album; and
    a distribution-of-image capturing position calculating section for calculating a distribution of image capturing positions of the plurality of images stored in said image storing section based on the image capturing position of the plurality of images stored in said image storing section,
    wherein said importance judging section judges that importance of the image capturing position is greater than the image capturing time when deviation of the distribution of image capturing positions calculated by said distribution-of-image capturing position calculating section is larger than a reference value set in advance.

2. The album generating apparatus as set forth in claim 1, further comprising:
    a distribution-of-image capturing time calculating section for calculating a distribution of image capturing times of the plurality of images stored in said image storing section based on the image capturing time of the plurality of images stored in said image storing section,
    wherein said image capturing time sorting section sorts the plurality of images stored in said image storing section so that a number of images sorted into each page of the album is almost equalized based on the distribution of image capturing times calculated by said distribution-of-image capturing time calculating section.

3. The album generating apparatus as set forth in claim 1, wherein said image capturing position sorting section sorts the plurality of images stored in said image storing section so that a number of images sorted into each page of the album is almost equalized based on the distribution of image capturing positions calculated by said distribution-of-image capturing position calculating section.

4. The album generating apparatus as set forth in claim 1 further comprising:
    an image capturing position sorting section for sorting the plurality of images stored in said image storing section per page of the album based on the image capturing position stored in said image storing section when said importance judging section judges that the importance of the image capturing position is greater than that of the image capturing time.

5. The album generating apparatus as set forth in claim 4, wherein when a distribution of the image capturing positions stored in said image storing section is geographically dispersed, said layout determining section lays out the images sorted per page by said image capturing position sorting section so that each page stores images whose image capturing positions are close to each other, and when a distribution of the image capturing positions stored in said image storing section is not geographically dispersed, said layout determining section lays out the image sorted per page by said image capturing time sorting section so that each page stores images whose image whose image capturing times are close to each other.

6. The album generating apparatus as set forth in claim 1, wherein the images are laid out by said layout determining section so that each page of the album stores images whose image capturing times are close to each other.

7. A processor based album generating apparatus, comprising:

an image storing section for storing images by correlating with image capturing time and image capturing position of the images;

an importance judging section for judging importance of the image capturing time and image capturing position in the plurality of images stored in said image storing section;

an image capturing time sorting section for sorting the plurality of images stored in said image storing section per page in the album based on the image capturing time stored in said image storing section when the importance judging section judges that the importance of the image capturing time is greater than that of the image capturing position;

a layout determining section for laying out the images sorted per page by said image capturing time sorting section to each page of the album;

a main image selecting section for selecting a main image that is to be a primary image in a predetermined page of the album out of the images sorted into said predetermined page by said image capturing time sorting section or image capturing position sorting section; and a subsidiary image selecting section for selecting a subsidiary image that is to be an image subsidiary to the main image selected by said main image selecting section in said predetermined page in the album out of the images sorted into said predetermined page by said image capturing time sorting section or said image capturing position sorting section based on contents of the main image selected by said main image selecting section, wherein said layout determining section lays out the main image selected by said main image selecting section and the subsidiary image selected by said subsidiary image selecting section into said predetermined page of the album based on the contents of the main image selected by said main image selecting section and the subsidiary image selected by said subsidiary image selecting section.

8. An album generating method, comprising:

utilizing one or more processors to execute a process comprising:

an image storing step of storing images by correlating with image capturing time and image capturing position of the images, the image capturing time being the time at which the image was captured, the image capturing position being the location at which the image was captured;

an importance judging step of judging importance of the image capturing time and image capturing position in the plurality of images stored in said image storing step and judging whether the importance of the image capturing time is greater than that of the image capturing position;

an image capturing time sorting step of sorting the plurality of images stored in said image storing step per page in the album based on the image capturing time stored in said image storing step when it is judged in said importance judging step that the importance of the image capturing time is greater than that of the image capturing position; and a layout determining step of laying out the images sorted per page in said image capturing time sorting step to each page of the album; and a distribution-of-image capturing position calculating step for calculating a distribution of image capturing positions of the plurality of images stored in said image storing step based on the image capturing position of the plurality of images stored in said image storing step, wherein said importance judging step judges that importance of the image capturing position is greater than the image capturing time when deviation of the distribution of image capturing positions calculated by said distribution-of-image capturing position calculating step is larger than a reference value set in advance.

9. The album generating method as set forth in claim 8, the executed process further comprising:

an image capturing position sorting step of sorting the plurality of images stored in said image storing step per page of the album based on the image capturing position stored in said image storing step when said importance judging section judges that the importance of the image capturing position is greater than that of the image capturing time.

10. The album generating method as set forth in claim 9, wherein when a distribution of the image capturing positions stored in said image storing step is geographically dispersed, said layout determining section lays out the images sorted per page by said image capturing position sorting step so that each page stores images whose image capturing positions are close to each other, and when a distribution of the image capturing positions stored in said image storing step is not geographically dispersed, said layout determining step lays out the image sorted per page by said image capturing time sorting step so that each page stores images whose image whose image capturing times are close to each other.

11. The album generating method as set forth in claim 8, wherein the images are laid out by said layout determining step so that each page of the album stores images whose image capturing times are close to each other.

12. A non-transitory computer readable medium on which is stored a program which when executed by an album generating apparatus for generating an album, causes said album generating apparatus to function as:

an image storing section for storing images by correlating with image capturing time and image capturing position of the images, the image capturing time being the time at which the image was captured, the image capturing position being the location at which the image was captured;

an importance judging section for judging importance of the image capturing time and image capturing position in the plurality of images stored in said image storing section and judging whether the importance of the image capturing time is greater than that of the image capturing position;

an image capturing time sorting section for sorting the plurality of images stored in said image storing section per page in the album based on the image capturing time stored in said image storing section when the importance judging section judges that the importance of the image capturing time is greater than that of the image capturing position; and a layout determining section for laying out the images sorted per page by said image capturing time sorting section to each page of the album; and a distribution-of-image capturing position calculating section for calculating a distribution of image capturing positions of the plurality of images stored in said image storing section based on the image capturing position of the plurality of images stored in said image storing section, wherein said importance judging section judges that importance of the image capturing position is greater than the image capturing time when deviation of the distribution of image capturing positions calculated by said distribution-of-image capturing position calculating section is larger than a reference value set in advance.

13. The computer-readable medium as set forth in claim 12, wherein said program further causes said album generating apparatus to function as:

an image capturing position sorting section for sorting the plurality of images stored in said image storing section per page of the album based on the image capturing position stored in said image storing section when said importance judging section judges that the importance of the image capturing position is greater than that of the image capturing time.

14. The computer-readable medium as set forth in claim 13, wherein when a distribution of the image capturing positions stored in said image storing section is geographically dispersed, said layout determining section lays out the images sorted per page by said image capturing position sorting section so that each page stores images whose image capturing positions are close to each other, and when a distribution of the image capturing positions stored in said image storing section is not geographically dispersed, said layout determining section lays out the image sorted per page by said image capturing time sorting section so that each page stores images whose image whose image capturing times are close to each other.

15. The computer-readable medium as set forth in claim 12, wherein the images are laid out by said layout determining section so that each page of the album stores images whose image capturing times are close to each other.

* * * * *